(12) United States Patent
Trivedi et al.

(10) Patent No.: US 12,153,504 B2
(45) Date of Patent: Nov. 26, 2024

(54) AGGREGATE FAILOVER FOR A DISTRIBUTED SCALE-OUT STORAGE SYSTEM

(71) Applicant: NetApp Inc., San Jose, CA (US)

(72) Inventors: Yash Hetal Trivedi, Cary, NC (US); Daniel McCarthy, Erie, CO (US); Ananthan Subramanian, San Ramon, CA (US); William Arthur Gutknecht, Greensboro, NC (US); Kevin Daniel Varghese, Milpitas, CA (US); Swaroop Vikram Choudhari, San Jose, CA (US); Abdul Basit, Morrisville, NC (US); Christopher Clark Corey, Boulder, CO (US); Chad Edmund Schneider, Fort Collins, CO (US)

(73) Assignee: NetApp, Inc., San Jose, CA (US)

( * ) Notice: Subject to any disclaimer, the term of this patent is extended or adjusted under 35 U.S.C. 154(b) by 111 days.

(21) Appl. No.: 18/089,192

(22) Filed: Dec. 27, 2022

(65) Prior Publication Data
US 2024/0118981 A1 Apr. 11, 2024

Related U.S. Application Data

(60) Provisional application No. 63/413,453, filed on Oct. 5, 2022.

(51) Int. Cl.
*G06F 11/00* (2006.01)
*G06F 11/16* (2006.01)
*G06F 11/20* (2006.01)

(52) U.S. Cl.
CPC ...... *G06F 11/2025* (2013.01); *G06F 11/1662* (2013.01)

(58) Field of Classification Search
CPC ................. G06F 11/1662; G06F 11/202–2051
See application file for complete search history.

(56) References Cited

U.S. PATENT DOCUMENTS 8,904,231 B2   12/2014  Coatney et al.
2012/0042202 A1*  2/2012  Wenzel .................. H04L 69/40
                                                  714/E11.089

(Continued)

OTHER PUBLICATIONS

Tibbo Systems, Distributed Architecture, 2001-2023, 11 pages (Year: 2023).*

(Continued)

*Primary Examiner* — Michael Maskulinski
(74) *Attorney, Agent, or Firm* — Cooper Legal Group, LLC

(57) ABSTRACT

Techniques are provided for failing over an aggregate from one file system instance to a different file system instance of a distributed scale-out storage system. The aggregate may be stored within distributed storage that is accessible to a plurality of file system instances of the distributed scale-out storage system. When the aggregate is failed over from a first file system instance to a second file system instance, the first file system instance may still have a valid read lease that allows the first file system instance to serve client I/O, directed to the aggregate, using a cache. In order to prevent the first file system instance from serving stale data from the cache before the read lease expires, state machines and a set of control data are used to ensure that the second file system instance attaches to the aggregate only after the read lease has expired.

20 Claims, 14 Drawing Sheets

(56) References Cited

U.S. PATENT DOCUMENTS

| | | | | |
|---|---|---|---|---|
| 2014/0317159 | A1* | 10/2014 | Dhavale | G06F 16/13 707/823 |
| 2020/0125537 | A1* | 4/2020 | Busick | H04L 47/786 |
| 2022/0391138 | A1 | 12/2022 | Dronamraju et al. | |

OTHER PUBLICATIONS

IBM, Containerization Explained, Dec. 29, 2022, retrieved from Wayback Machine, 14 pages (Year: 2022).*

IBM, What is Containerization?, Stephanie Susnjara and Ian Smalley, May 20, 2024, 28 pages (Year: 2024).*

NetApp, What is Google Kubernetes Engine?, Jun. 10, 2021 (Year: 2021).*

NetApp, Kubernetes Autoscaling: 3 Methods and How to Make them Great, What is Autoscaling in Kubernetes, retrieved from Internet Jan. 27, 2022, 10 pages (Year: 2022).*

OSD Developer documentation, Preventing Stale Reads, 2016, 3 pages (Year: 2016).*

Tech_OnTap; Enterprise-Ready Scale-Out with Clustered Data ONTAP 8; Jun. 20, 2012; 4 Pgs.

Kodavali, et al.; NetApp Deployment Guidelines and Storage Best Practices for Windows Server 2016; Nov. 2016; TR-4568; 54 Pgs.

ScaleOut Software Inc.; ScaleOut In-Memory Database; 2022; 24 Pgs.

NetApp; Astra Control Service documentation; Aug. 10, 2022; 114 Pgs.

Cloud Central; The story of stateful applications on Kubernetes; Oct. 12, 2021; 4 Pgs.

Cloud Central; The key pillars of the Astra Data Store architecture; Apr. 13, 2022; 5 Pgs.

Abbassi P., "Vertical Autoscaling in Kubernetes Giant Swarm," Vertical Autoscaling in Kubernetes, 2022, Retrieved from the Internet at: https://www.giantswarm.io/blog/vertical-autoscaling-in-kutbernetes, retrieved on Jan. 27, 2022, 10 pages.

Astra- Protect., "Application Data Protection, Mobility and Storage for Cloud Native Applications", retrieved Jun. 23, 2022, Cloud Central, Astra Family, Astra-Protect, Move and Store Your Kubernetes Persistent Data, Reprinted from the Internet at: https://cloud.netapp.com/astra, 8 pages.

Kubernetes., "Production-Grade Container Orchestration," 2021, 6 pages. Retrieved from the Internet on Jan. 27, 2022: [https://www.kubernetes.io/].

LEASE-Hvac0.11 Documentation, retrieved on Jan. 27, 2022, 5 pages.

Oracle Cloud Infrastructure Documentation, Using the Kubernetes Vertical Pod Autoscaler, retrieved on Jan. 27, 2022, 9 pages.

sys/leases—HTTP API, Vault by HashiCorp, 2022, Retrieved from Internet Jan. 27, 2022: https://www.vaultproject.io/api-docs/system/leases. 11 pages.

"Use Cases", 2022, NetApp Cloud Volumes Service for Google Cloud, Cloud Architecture Center, Retrieved from the Internet at: https://cloud.google.com/architecture/partners/netapp-cloud-volumes/use-cases, retrieved on Jan. 27, 2022, 4 pages.

"Vertical Pod Autoscaler", Amazon EKS User Guide, Retrieved from the Internet at: https://docs.aws.amazon.com/eks/latest/userguide/vertical-pod-autoscaler.html, retrieved on Jan. 27, 2022, 5 pages.

"Vertical Pod Autoscaling", Kubernetes Engine Documentation, Google Cloud, Retrieved from the Internet at: https://docs.aws.amazon.com/eks/latest/userguide/vertical-pod-autoscaler.html, retrieved on Jan. 27, 2022, 9 pages.

"What Can NetApp's Cloud Volumes Services Do?", Volta, 2022. Retrieved from the Internet at: https://voltainc.com/cloud-volumesservices/, retrieved on Jan. 27, 2022, 3 pages.

* cited by examiner

AGGREGATE FAILOVER FOR A DISTRIBUTED SCALE-OUT STORAGE SYSTEM

RELATED APPLICATIONS

This application claims priority to U.S. Provisional patent application, titled "AGGREGATE FAILOVER FOR A DISTRIBUTED SCALE-OUT STORAGE SYSTEM", filed on Oct. 5, 2022 and accorded Application No. 63/413,453, which is incorporated herein by reference.

TECHNICAL FIELD

Various embodiments of the present technology relate to failing over an aggregate from one file system instance to another file system instance of a distributed scale-out storage system. More specifically, some embodiments relate to performing an aggregate failover from a file system instance holding a read lease to a different file system instance.

BACKGROUND

Many storage systems provide data redundancy and failover functionality. A storage system may be configured according to a high availability pair of two storage nodes. One of the storage nodes may be a primary storage node that actively processes client I/O operations directed to storage accessible to the high availability pair. The other node may be a secondary storage node that is configured to perform a failover operation to take over for the primary storage node in the event the primary storage node fails. When the secondary storage node takes over for the primary storage node and starts processing client I/O operations, the primary storage node should not continue to process other client I/O operations directed to the storage. Otherwise, the primary storage node could cause data loss and/or corruption. Performing the failover in a safe manner where the primary storage node can no longer access the storage may be accomplished through a disk driver of a dual ported drive and/or hardware for SAN storage. When the disk driver recognizes that the secondary storage node has taken over for the primary storage node, the disk driver blocks the primary storage node from writing to the dual ported driver, thus mitigating data loss and/or corruption.

DESCRIPTION OF THE DRAWINGS

Embodiments of the present technology will be described and explained through the use of the accompanying drawings in which.

Figure 1A:
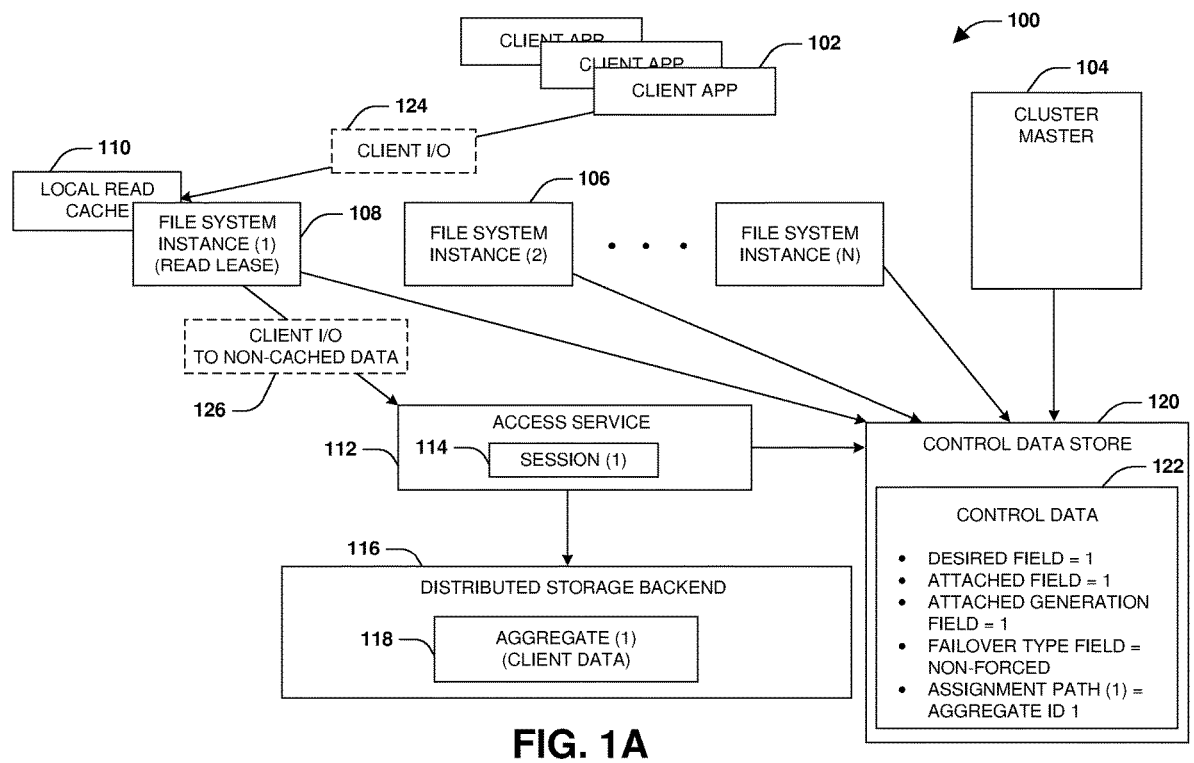
FIGS. 1A-1H are block diagrams illustrating an example of performing an aggregate failover in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

Various embodiments of the present technology relate to implementing aggregate failover for a distributed scale-out storage system. More specifically, some embodiments relate to failing over an aggregate from a first file system instance holding a read lease to a second file system instance in a manner that avoids the first file system instance serving stale data from a local read cache and performing write operations with out-of-date information that could lead to corruption or data loss.

The distributed scale-out storage system is capable of scaling out to any number of nodes that can process client I/O operations directed to a distributed storage backend accessible to all of the nodes. The nodes may be implemented as containers, virtual machines, or other software constructs that can be created and/or deleted on-demand in order to scale up or down with current demand. A node may host any number of file system instances that actively process client I/O operations directed to aggregates hosted within the distributed storage backend for storing client data. Because all of the file system instances of the distributed scale-out storage system have access to the distributed storage backend, failing over aggregates from one file system instance to another file system instance is challenging and non-trivial. Aggregate failover is also challenging because the distributed scale-out storage system may be implemented as a software defined network that uses network partitioning between nodes (e.g., nodes may be implemented as containers running on the same hardware, and thus network partitioning is used to separate the nodes). Because network partitioning is used to separate the nodes, a node of a cluster can become isolated from other nodes of the cluster. When the node is isolated from the other nodes of the cluster, the node may still be operational and have access to the distributed storage backend. Thus, the node could still be processing client I/O operations. This becomes problematic if a cluster master node is unable to communicate with the isolated node, and thus implements a failover operation of an aggregate from a file system instance of the isolated node to a file system instance of a different node. At this point, both file system instances have access to the distributed storage backend and could both start processing client I/O operations, which can result in data loss, corruption, etc.

In order to solve this problem where two file system instances could be processing I/O operations directed to the same aggregate during the same timeframe, an access service is implemented. If a file system instance is to perform I/O operations directed to an aggregate, then the file system instance must establish a session with the access service and attach to the aggregate. Thus, the access service can ensure that only a single file system instance has a session and is attached to the aggregate for performing I/O operations directed to the aggregate. However, performing a safe failover becomes more complicated and challenging when the access service issues read leases that allow file system instances to locally process I/O operations from a local read cache without accessing the access service. In particular, a file system instance may implement a local read cache in memory to improve performance and reduce latency because the file system instance can process I/O operations using the local read cache must faster than having to go through the access service to access higher latency storage of the distributed storage backend that could also be located over a network remote to the node hosting the file system instance. The read lease may have a certain expiration (e.g., 6 seconds) after which the read lease cannot be used to process client I/O operations from the local read cache. If the cluster master fails the aggregate over to a different file system instance, then the file system instance of the isolated node could still hold a non-expired read lease that would allow the file system instance to serve stale data from the local read cache and/or perform write or overwrite operations using out-of-date information that could lead to corruption or data loss.

The techniques provided herein relate to an aggregate failover technique that utilizes state machines and control data within a control data store to implement and track performance of non-forced (ungraceful) and forced (graceful) failover of an aggregate in a manner that ensures that stale data is not used to process I/O operations, and ensures that corruption or data loss do not occur from operations using out-of-data information. The aggregate failover technique utilizes state machines to track the progress of aggregate failover to ensure that the aggregate is failed over in a manner where two file system instances are not both processing client I/O operations directed to the aggregate. This mitigates instances where the new owner file system instance of the aggregate could be processing client I/O operation while the original owner file system instance of the aggregate is also processing client I/O operations from a local read cache using a read lease that has not yet expired. The state machines may be implemented internally by file system instances, implemented by a cluster master (a cluster master node) that coordinates and triggers the aggregate failover, implemented by the access service through which the file system instances gain access to the aggregate, and/or implemented within the control data store.

The state machines are used to perform verification checks using a set of control data maintained within the control data store. The set of control data is populated with fields indicating which file system instance is to attach to and take over an aggregate (e.g., a desired field), a file system instance that is currently attached to the aggregate (e.g., an attached field), and/or a value that is incremented when the cluster master initiates an aggregate failover (e.g., an attached generation field). A failover type field may be populated with information to indicate whether the aggregate failover is a non-forced failover where the original owner file system instance can terminate the read lease and detach from the aggregate before the new owner file system instance attaches to the aggregate, or a forced failover where the new owner file system instance must wait a delay before attaching to the aggregate in order for the read lease to expire before attaching to the aggregate.

The state machines transition states based upon the fields within the set of control data in order to implement and track progress of the aggregate failover. The state transitions ensure that the new owner file system instance waits the delay for the read lease to expire in the event the aggregate failover is a forced failover by the cluster master. The forced failover is where the original owner file system instance is unable to coordinate with the cluster master and gracefully terminate the read lease because the cluster master is unable to communicate with the original owner file system instance. Also, the state transitions allow the new owner file system instance to attach to the aggregate without waiting the delay for a non-forced aggregate failover. The new owner file system instance does not need to wait the delay because the original owner file system instance is able to coordinate with the cluster master to terminate the read lease, thus reducing the time for performing the non-forced aggregate failover.

In some embodiments, a state machine and the set of control data are implemented within the control data store accessible to the file system instances of the distributed scale-out storage system. The cluster master may be configured to transition the state machine amongst various states and modify the set of control data in order to perform forced and non-forced aggregate failovers for dynamically modifying aggregate placement amongst file system instances during operation of the distributed scale-out storage system with little to no client disruption. Aggregate failover is fast and efficient because the state machines and the set of control data are used to safely failover an aggregate from one file system instance to another file system instance with minimal to no client disruption because either the prior owner file system instance or the new owner file system instance will be processing client I/O operations without having to queue or quiesce/block client I/O operations. The prior owner file system instance can serve client I/O operations from the local read cache until the read lease expires because the new owner file system instance is waiting until the read lease expires so that the cached data within the local read cache does not become stale from the new owner file system instance processing client I/O operations.

The original owner file system instance, the new owner file system instance, and/or the access service that provides file system instances with access to the aggregate may also maintain state machines and/or utilize the set of control data within the control data store to perform coordinated actions for implementing the aggregate failover. The access service may utilize a state machine and the set of control data to determine which file system instance should be allowed to establish a session with the access service for attaching to the aggregate, and which file system instances should be denied. The new owner file system instance may utilize an internal state machine and the set of control data to determine whether to wait or not wait a delay before attaching to the aggregate. The original owner file system instance may utilize an internal state machine and the set of control data to determine if a non-forced aggregate failover is to be implemented where the original owner file system instance gracefully detaches from the aggregate and terminates the read lease so that the new owner file system instance does not have to wait the delay.

In some embodiments, the set of control data stored within the control data store may include a desired field. The cluster master may set the desired field to a file system instance identifier of a file system instance that is to take ownership of and attach to the aggregate. The set of control data may include an attached field that is populated with a file system instance identifier of a file system instance that is currently attached to the aggregate. The cluster master may clear the attached field (or an attached generation field) as a trigger to the access service to terminate the session with the prior owner file system instance so that the prior owner file system instance cannot access the aggregate through the access service.

The new owner file system instance may populate the attached field with a file system instance identifier of the new owner file system instance once the new owner file system instance has attached to the aggregate. The set of control data may include an attached generation field that is incremented by the cluster master each time the cluster master triggers failover of the aggregate to a different file system instance. When the access service determines that the attached generation field has been incremented for the aggregate, the access service terminates a current session for the aggregate because ownership of the aggregate is going to be changed away from the prior owner file system instance that has the current session for the aggregate. In this way, the state machines implemented by the cluster master, the file system instances, and the access service can utilize the values within the set of control data in order to determine when to transition states associated with progress/actions performed in order to implement aggregate failover.

In addition, various embodiments of the present technology provide for a wide range of technical effects, advantages, and/or improvements to computing systems and components. For example, various embodiments may include one or more of the following technical effects, advantages, and/or improvements: 1) performing an aggregate failover of an aggregate among file system instances hosted by nodes of a distributed scale-out storage system that supports read leases; 2) performing a forced aggregate failover from a prior owner file system instance to a new owner file system instance in a manner that ensures that the new owner file system instance waits a delay until a read lease held by the prior owner file system expires so that the prior owner file system does not serve stale data from a local read cache while the read lease is still valid; 3) performing a non-forced aggregate failover from a prior owner file system instance to a new owner file system instance in a manner that improves the time to complete the aggregate failover by enabling the new owner file system instance to attach to the aggregate faster without having to wait the delay for the read lease to expire since the prior owner file system instance will have already gracefully terminated the read lease; 4) maintaining a set of control data within a control data store accessible to a cluster master, file system instances, and an access service to use for implementing an aggregate failover in a coordinated manner that ensures that stale data is not being served from a local read cache and ensures that the write and overwrite operations do not use out-of-date information that could lead to corruption or lost data; 5) implementing non-convention and non-routine state machines internal to file system instances or within the distributed data store for utilization by the cluster master, the file system instances, and the access service to implement an aggregate failover in a coordinated manner that ensures that stale data is not being served from a local read cache and ensures that the write and overwrite operations do not use out-of-date information that could lead to corruption or lost data; and 6) utilizing a control data store (e.g., a centralized service) to store control data (e.g., within a centralized table implemented by microservices) used to convey information between the cluster master, the file system instances, and the access service, which removes the need for complex APIs.

In some embodiments of initially creating and/or attaching an aggregate to a file system instance of a node within a distributed scale-out storage system, a cluster master may implement a cluster master state machine for performing and tracking operations performed to assign the aggregate to the file system instance. The cluster master state machine may utilize a set of control data stored within a control data store (e.g., a centralized service for maintaining configuration information and/or other information used to provide distributed coordination of nodes, containers, services and/or cloud applications) for performing the assignment.

An initial state of the cluster master state machine may indicate that the set of control data for the aggregate is to be initialized (e.g., set to 0, none, null, empty, or some other initial value different than an actual file system instance identifier) as part of creating the aggregate. A desired field may be initialized to 0 to indicate that no file system instance has yet been designated by the cluster master to be the desired owner of the aggregate. An attached field may be initialized to 0 to indicate that no file system instance is currently attached to the aggregate. An attached generation field may be initialized to 0 to indicate that an ownership change of the aggregate has not yet been triggered by the cluster master.

Once the set of control data have been initialized based upon the initial state of the cluster master state machine, a first state of the cluster master state machine may be implemented. During the first state, the cluster master may determine whether a particular file system instance is to take over ownership of the aggregate for servicing client I/O operations. In some embodiments, the cluster master may determine that a file system instance (3) having a file system instance identifier of 3 is to take over ownership of the aggregate. Accordingly, the cluster master state machine may be transitioned to a second state where the cluster master is to update the desired field with the file system instance identifier of 3 for the file system instance (3) and increment the attached generation field to 1 to indicate that ownership of the aggregate is changing. At this point, the set of control data has: desired field=3, attached field=0, and attached generation field=1. Also, an attachment path (e.g., a field stored within the control data store) that is associated with the file system instance (3) is populated with an aggregate identifier of the aggregate. This triggers the file system instance (3) to initiate takeover of the aggregate. Whenever a file system instance is assigned a role for an aggregate, an aggregate identifier of the aggregate is added to an assignment path for that file system instance in order to trigger the file system instance to implement a state machine and coordinated workflows for taking over that role.

In response to the file system instance (3) identifying the aggregate identifier populated within the assignment path for the file system instance (3), the file system instance (3) implements an internal state machine for implementing and tracking progress of taking over the aggregate. During a first state of the internal state machine, the file system instance (3) sends a session establishment request to the access service for creation of a session with the access service. With the session, the access service will allow the file system instance (3) to access the aggregate stored within a distributed storage backend of the distributed scale-out storage system. Without the session, the access service will deny I/O operations sent by the file system instance (3) to the access service for execution upon the aggregate. As part of the session establishment request, the file system instance (3) includes the latest known values for the desired field and the attached generation field to the access service (desired field=3 and attached generation field=1). The access service will compare these values provided by the file system instance (3) to current values of these fields known to the access service. If the values match, then the access service will grant the session, otherwise, the access service will deny the session. A field may not match if the file system instance (3) loses communication access to the control data store prior to the field within the control data store being modified. In this scenario, the values match, and the access service grants the session to the file system instance (3). The access service has authority over whether to grant or deny sessions, along with other requests such as read lease requests and I/O operation requests.

The internal state machine is transitioned to a second state. During the second state, the file system instance (3) is to attach to the aggregate. Once the file system instance (3) has successfully attached to the aggregate for serving client I/O operations directed to the aggregate, the internal state machine is transitioned to a third state. During the third state, the file system instance (3) updates the attached field within the control data store with the file system instance identifier of 3 for the file system instance (3) to indicate that the file system instance (3) is currently attached to the aggregate. At this point, the set of control data has desired field=3, attached field=3, and attached generation field=1. Once the attached field has been updated, ownership of the aggregate is in a steady state. Accordingly, the file system instance (3) may update the internal state machine and/or the cluster master may update the cluster master state machine to a steady state or the state machines may be removed from memory to conserve resources.

When the file system instance (3) establishes the session and attaches to the aggregate, the file system instance (3) can obtain a read lease from the access service. The read lease may have an expiration such as 5 seconds or any other expiration time. When the read lease expires, the file system instance (3) can request a new read lease from the access service. The read lease allows the file system instance (3) to serve client I/O operations from a local read cache within memory of the node hosting the file system instance (3). The file system instance (3) can more quickly serve client I/O operations from the relative fast and low latency memory compared to going through the access service to access the aggregate in the distributed storage backend. This improves performance of the distributed scale-out storage system.

When the access service receives a request (e.g., a request to execute a client I/O operation directed to the aggregate; a request for a read lease; etc.), the access service executes a calculated owner function. The calculated owner function returns the calculated owner of an aggregate such that the access service will only process/allow the request if the requestor is the calculated owner of the aggregate. This ensures that only a single file system instance is allowed to access the aggregate at any given point in time based upon that file system instance being the current calculated owner. If the attached field=0 (e.g., or none, null, empty, or some other value different than a file system instance identifier), then the calculated owner function returns the file system instance identifier specified with the desired field as the calculated owner. If the attached field has a value corresponding to a file system instance identifier, then then calculated owner function returns that file system instance identifier specified with the attached field as the calculated owner. In this way, a file system instance identifier of a file system instance that submitted the request to the access service must match the calculated owner and the attached generation field value within the request must match the current attached generation field value known to the access service in order for the access service to grant the request.

At this point, the set of control data has desired field=3, attached field=3, and attached generation field=1. During steady state, the cluster master may determine that a file system instance (8) is to take over ownership of the aggregate. In some embodiments, the cluster master may be unable to communicate with the file system instance (3). Accordingly, the cluster master may assume that the file system instance (3) has failed, and thus implements a forced failover. The file system instance (3) may have failed, or may still be operational, but there is a network connectivity issue between the cluster master and the file system instance (3).

The cluster master transitions the cluster master state machine to a first state associated with performing a forced failover. During the first state of the forced failover, the cluster master may update the control data by removing the file system instance identifier of (3) from the attached field to indicate that the file system instance (3) is no longer to be attached to the aggregate. The cluster master may update the control data by setting the desired field to a file system instance identifier of 8 for the file system instance (8) to indicate that the file system instance (8) is to attach to the aggregate. In some embodiments, changing the attached field and the desired field may be performed as part of an atomic update. Additionally, the cluster master increments the attached generation field to 2 in order to indicate that ownership of the aggregate is changing. Furthermore, the cluster master may modified a failover type field within the control data to indicate that the failover of the aggregate is a forced failover. The failover type field will trigger the file system instance (8) to wait a delay (e.g., a delay equal to or greater than a maximum lifespan of a read lease such as 5 seconds) for any read lease held by the file system instance (3) to expire before establishing a session with the access service for attaching to the aggregate. An attachment path for the file system instance (8) may be set to an aggregate identifier of the aggregate.

At this point, the set of control data has desired field=8, attached field=0, attached generation field=2, the failover type field set to indicate that the failover is forced and that the file system instance (8) is to wait the delay, and the attachment path for the file system instance (8) set to the aggregate identifier of the aggregate. The cluster master may transition the cluster master state machine to a second state of the forced failover in order to wait on the file system instance (8) to establish the session with the access service, attach to the aggregate, and update the attached field to the file system instance identifier of (8).

In response to the file system instance (8) accessing the control data store and determining that the attachment path has been populated with the aggregate identifier of the aggregate, the file system instance (8) implements an internal state machine for establishing the session with the access service, attaching to the aggregate, and updating the attached field to the file system instance identifier of (8). In particular, the file system instance (8) implements an internal state machine for implementing and tracking progress of forcefully taking over the aggregate. During a first state of the internal state machine, the file system instance (8) determines that the failover type field within the control data store indicates that the failover is a forced failover. This field triggers the file system instance (8) to wait a delay (an expiration time period) before establishing the session with the access service and attaching to the aggregate. The delay may be set to a timespan corresponding to an expiration of a read lease (e.g., 5 seconds). Waiting the delay ensures that the file system instance (8) does not attach to the aggregate and start serving client I/O operations that could modify data within the aggregate, which could render cached data within the local read cache as stale data that could still be served by the file system instance (3) before the read lease expires. Once the file system instance (8) has waited the delay, the file system instance (8) transitions the internal state machine to a second state.

During a second state of the internal state machine, the file system instance (8) sends a request to the access service for creation of a session with the access service. With the session, the access service will allow the file system instance (8) to access the aggregate stored within a distributed storage backend of the distributed scale-out storage system. Without the session, the access service will deny I/O operations sent by the file system instance (8) to the access service for execution upon the aggregate. As part of the request, the file system instance (8) includes the latest known values for the desired field and the attached generation field to the access service (desired field=8 and attached generation field=2). The access service will compare these values provided by the file system instance (8) to current values of these fields known to the access service. If the values match, then the access service will grant the session, otherwise, the access service will deny the session. In this scenario, the values match, and the access service grants the session to the file system instance (8).

The internal state machine is transitioned to a third state where the file system instance (8) is to attach to the aggregate. Once the file system instance (8) has successfully attached to the aggregate for serving client I/O operations directed to the aggregate, the internal state machine is transitioned to a fourth state. During the fourth state, the file system instance (8) updates the attached field within the control data store with the file system instance identifier of 8 for the file system instance (8) to indicate that the file system instance (8) is currently attached to the aggregate. At this point, the set of control data has desired field=8, attached field=8, and attached generation field=2. In response to the attached field being updated, the failover type field populated with the indicator that the failover is a forced failover may be cleared by the cluster master or the file system instance (8). Once the attached field has been updated, ownership of the aggregate is in a steady state. Accordingly, the file system instance (8) may update the internal state machine and/or the cluster master may update the cluster master state machine to a steady state or remove the state machines from memory. In this way, the forced failover is performed by triggering the delay that is waited by the file system instance (8) so that any read lease still held and/or used by the file system instance (3) to serve client I/O operations from the local read cache can expire before the file system instance (8) attaches to the aggregate and starts servicing client I/O operations.

When the cluster master incremented the attached generation field to 2, the access service would terminate the current session of the file system instance (3). When the file system instance (3) would attempt to perform an I/O operation directed to the aggregate through the access service (e.g., a read or write request not directed to cached data within the local read cache), the access service will reject the I/O operation. The access service will reject the I/O operation because the I/O operation includes a session identifier of the current session that was terminated and an attached generation value of 1 (e.g., the last known attached generation value known by the file system instance (3)) that will not match the current attached generation value of 2 known to the access service.

Because the current session of the file system instance (3) has been terminated by the access service, the file system instance (3) will need to establish a new session in order to perform the I/O operation. The access service will only allow 1 active session for an aggregate at any given time. The access service will reject a session establishment request from the file system instance (3) because the session establishment request will include a desired value of 3 and an attached generation value of 1, which will not match the current desired field of 8 and the current attached generation field of 2 known to the access service. If the file system instance (3) receives a threshold number of rejections for establishing the new session (e.g., 4 rejections), then the file system instance (3) will deconstruct an in-memory infrastructure for the aggregate.

In some embodiments, the cluster master may perform a graceful failover of the aggregate. The graceful failover of the aggregate is similar to the forced failover other than that the prior owner file system instance and the cluster master can coordinate together to perform the graceful failover where the cluster master can trigger the prior owner file system instance to gracefully detach from the aggregate and terminate the read lease. Thus, the new owner file system instance does not need to wait the delay because the read lease will already be terminated. In some embodiments, when the cluster master determines that the graceful failover is to be performed (e.g., for load balancing, performance balancing, or other reasons) from the file system instance (8) to a file system instance (2), the cluster master sets the desired field to 2 corresponding to a file system instance identifier of 2 for the file system instance (2). The cluster master increments the attached generation field to 3, which causes the access service to terminate the session with the file system instance (8).

Since the file system instance (8) is still operational and has communication capabilities, the file system instance (8) will determine that the desired field is not set to its file system instance identifier of 8. Also, the access service will require the file system instance (8) to establish a new session. Because the desired field is not set to its file system instance identifier of 8, the file system instance (8) gracefully detaches from the aggregate and terminates the read lease. Once detached, the file system instance (8) clears the attached field. The failover type field previously set to indicate a forced failover may be set to indicate a non-forced failover or may be cleared. This is an indication to the file system instance (2) that the file system instance (2) does not need to wait the delay, but can start establishing a session and attaching to the aggregate once the desired field is set to 2 and the attached field has been cleared. Once the file system instance (2) has attached to the aggregate, the file system instance (2) populates the attached field with its file system instance identifier of 2. The file system instances, the cluster master, and/or the access service may similarly implement state machines to implement and track the progress of the non-forced failover.

FIGS. 1A-1H are block diagrams illustrating an example of performing an aggregate failover in accordance with an embodiment of the present technology. A distributed scale-out storage system 100 includes a distributed storage backend 116 of storage accessible to a plurality of file system instances hosted by nodes of the distributed scale-out storage system 100, as illustrated by FIG. 1A. A node may be implemented as a container (e.g., a Kubernetes container), a serverless thread, a virtual machine, or other hardware and/or software. The node may host any number of file system instances that are configured to provide client applications with access to the distributed storage backend 116. In some embodiments, a first file system instance 108 may store client data within a first aggregate 118 (e.g., corresponding to volumes, LUNs, or other data containers for storing data) stored within the distributed storage backend 116. The first file system instance 108 may process client I/O operations 124 from a client application 102. The client I/O operations 124 may be directed to the first aggregate 118 stored within the distributed storage backend 116.

A cluster master 104 of the distributed scale-out storage system 100 (e.g., a cluster node of a cluster of nodes within the distributed scale-out storage system 100) may determine which file system instance is to be a current owner of an aggregate for processing client I/O directed to the aggregate. The cluster master 104 may dynamically assign and reassign ownership of aggregates amongst file system instances for load balancing, performance balance, failover for a failed file system instance, or other purpose. The cluster master 104 may either implement a non-forced failover (a graceful failover) to change ownership of an aggregate from one file system instance to another file system instance or a forced failover (an ungraceful failover) to force an ownership change of the aggregate. The non-forced failover may be implemented if the current owner file system instance is still operational and in communication with the cluster master 104 such that the cluster master 104 and the current owner file system instance can perform coordinate actions to change ownership of the aggregate. The forced failover may be implemented if the cluster master 104 cannot communicate with the current owner file system instance.

In some embodiments, the cluster master 104 may initially assign ownership of the first aggregate 118 to the first file system instance 108. In order to initially assign the first aggregate 118 to the first file system instance 108, the cluster master 104 sets a desired field within control data 122 of a control data store 120 to a file system instance identifier of 1 for the first file system instance 108. In some embodiments, the control data store may be implemented as a centralized service hosting a database within which the control data 122 is stored and accessible to nodes, file system instances, access services, the cluster master 104, and/or other components or services of the distributed scale-out storage system 100. Because the cluster master 104 is assigning a role to the first file system instance 108 (e.g., an ownership role), the cluster master 104 may set a first assignment path for the first file system instance 108 with a first aggregate identifier of 1 for the first aggregate 118. This will trigger that first file system instance 108 to implement a state machine instance to perform operations in order to take over the role for the first aggregate 118. Because the cluster master 104 is changing ownership of the first aggregate 118, the cluster master 104 increments an attached generation field within the control data 122 to a value of 1.

The first file system instance 108 reads the control data 122 within the control data store 120 and determines that the first aggregate identifier of 1 is set within the first assignment path for the first file system instance 108 and that a failover type field is set to indicate a non-forced failover of the first aggregate 118. This triggers the first file system instance 108 to establish a first session 114 with an access service 112 that provides file system instances with access to aggregates within the distributed storage backend 116. If a file system instance has not established a session with the access service 112 for accessing an aggregate, then the access service 112 will deny requests by the file system instance to access the aggregate. Accordingly, the first file system instance 108 establishes the first session 114 with the access service 112 for obtaining access to the first aggregate 118 through the access service 112, and then attaches to the first aggregate 118 in order to process client I/O operations directed to the first aggregate 118. In response to attaching to the first aggregate 118, the first file system instance 108 sets an attached field to the file system instance identifier of 1.

Once the first file system instance 108 is attached to the first aggregate 118, the first file system instance 108 may establish a read lease with the access service 112. The read lease may have an expiration such as 5 seconds. Once expired, the first file system instance 108 must request a new read lease. While the read lease is valid, the first file system instance 108 is allowed to process client I/O operations using a local read cache 110 hosted within memory, which is more performant due to the lower latency of accessing the local read cache 110 compared to accessing the first aggregate 118 within the distributed storage backend 116 through the access service 112. The first file system instance 108 directs client I/O operations 126, directed to non-cached data, to the access service 112 for execution upon the first aggregate 118 based upon the first session 114 being valid. In this way, the distributed scale-out storage system 100 may be in a steady state, as illustrated by FIG. 1A.

Figure 1B:
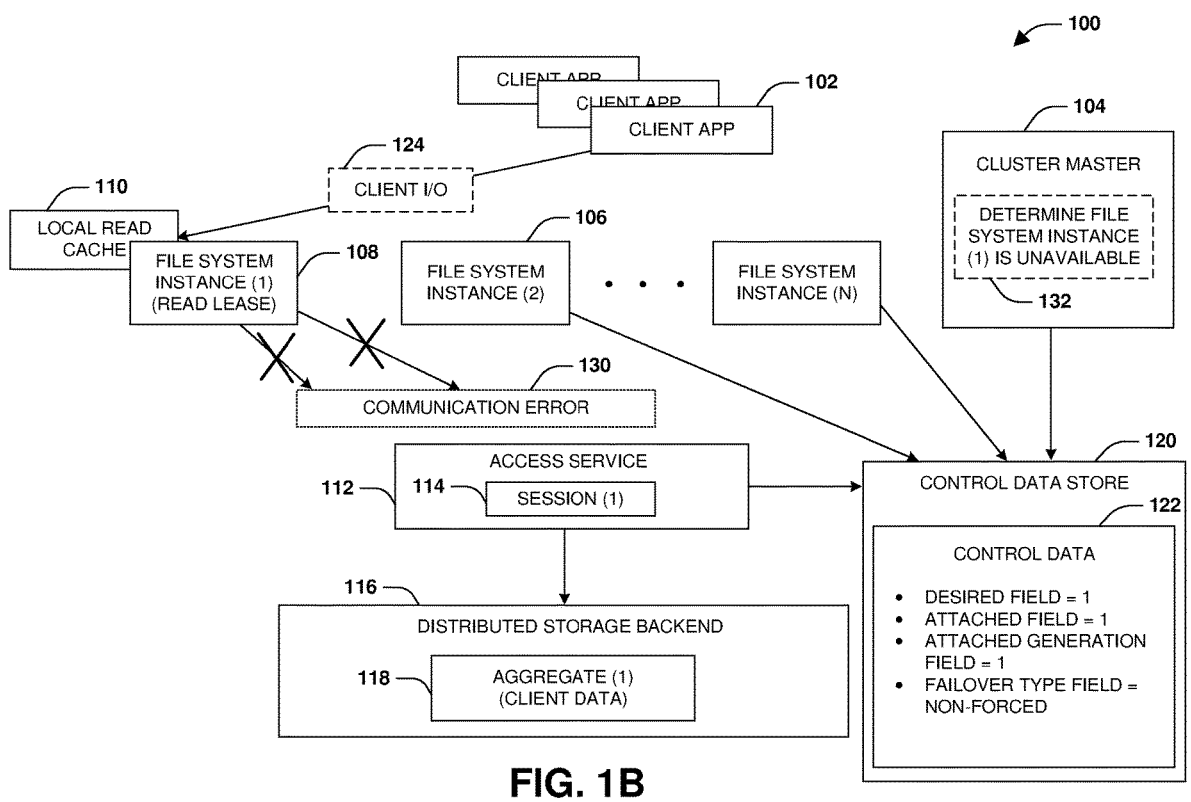

At a subsequent point in time after reaching steady state, the cluster master 104 may determine 132 that the first file system instance 108 is unavailable and should no longer own the first aggregate 118, as illustrated by FIG. 1B. This determination 132 may be made based upon the cluster master 104 determining (assuming) that the first file system instance 108 has failed based upon a loss of a heartbeat, an inability to communicate with the first file system instance 108, a determination that the first file system instance 108 has a degraded health state, etc. In some embodiments, the first file system instance 108 may still be operational, but a communication error 130 may have occurred. The communication error 130 may result in a network partition where the first file system instance 108 is unable to communicate with the control data store 120 and the cluster master 104, but is still able to communicate with the client application 102 and the access service 112 that may be hosted on the same node as the first file system instance 108.

Figure 1C:
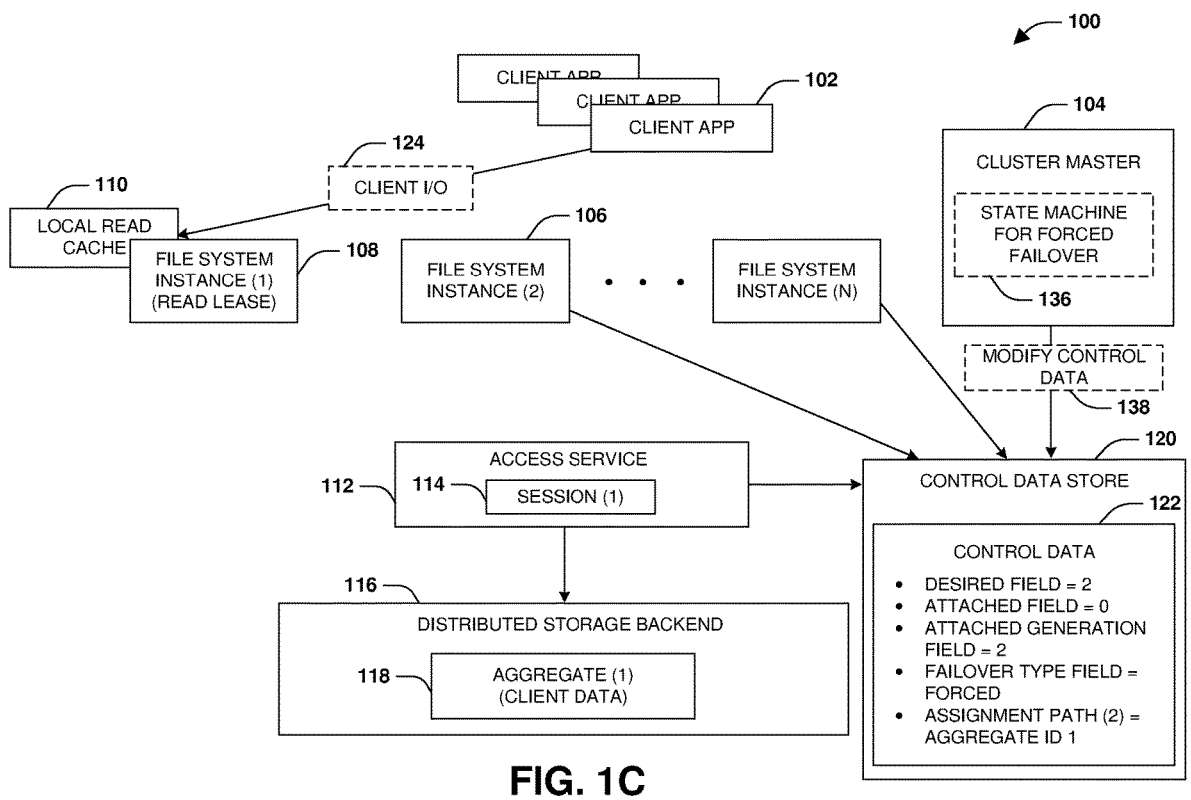

In this way, the cluster master 104 determines 132 that the first file system instance 108 is unavailable and ownership of the first aggregate 118 should be forcefully failed over to a second file system instance 106 (e.g., a newly created/spun-up file system instance or an existing file system instance identified as having adequate bandwidth and resources for taking over ownership of the first aggregate 118). Accordingly, the cluster master 104 implements a cluster master state machine 136 for implementing and tracking the forced failover of the first aggregate 118, as illustrated by FIG. 1C. It may be appreciated that other state machines may also be implemented by file system instances and the access service 112 for implementing and tracking the forced failover, non-forced failovers, aggregate attachment, aggregate detachment, etc. These state machines may be implemented as internal state machines within a file system instance or service, or may be implemented within the control data store 120. The state machines may transition between various states based upon the fields within the control data 122 in order to perform coordinated actions associated with corresponding states.

During a first state of the cluster master state machine 136, the cluster master 104 modifies 138 the control data 122 in order to trigger the second file system instance 106 to establish a session and attach to the first aggregate 118, and for the access service 112 to terminate the first session 114 with the first file system instance 108. In particular, the cluster master 104 clears the attached field (e.g., sets the attached field to 0) in order to signal that no file system instance should be attached to the first aggregate 118. The cluster master 104 sets the desired field to a second file system instance identifier of 2 for the second file system instance 106. Because the cluster master 104 is changing ownership of the first aggregate 118, the cluster master 104 increments the attached generation field to 2 for the first aggregate 118 in order to trigger that access service 112 to terminate the first session 114. The cluster master 104 sets a second assignment path for the second file system instance 106 to the first aggregate identifier of 1 for the first aggregate 118 in order to trigger the second file system instance 106 to establish a session and attach to the first aggregate 118. Because the cluster master 104 is performing a forced failover, the cluster master 104 sets the failover type field to indicate that the failover is forced in order to trigger the second file system instance 106 to wait a delay (e.g., 5 seconds) before establishing a session and attaching to the first aggregate 118. The delay is set to a timespan that allows for the read lease held by the first file system instance 108 to expire. Once the control data 112 has been modified 138, the cluster master state machine 136 may be transitioned to a second state.

Figure 1D:
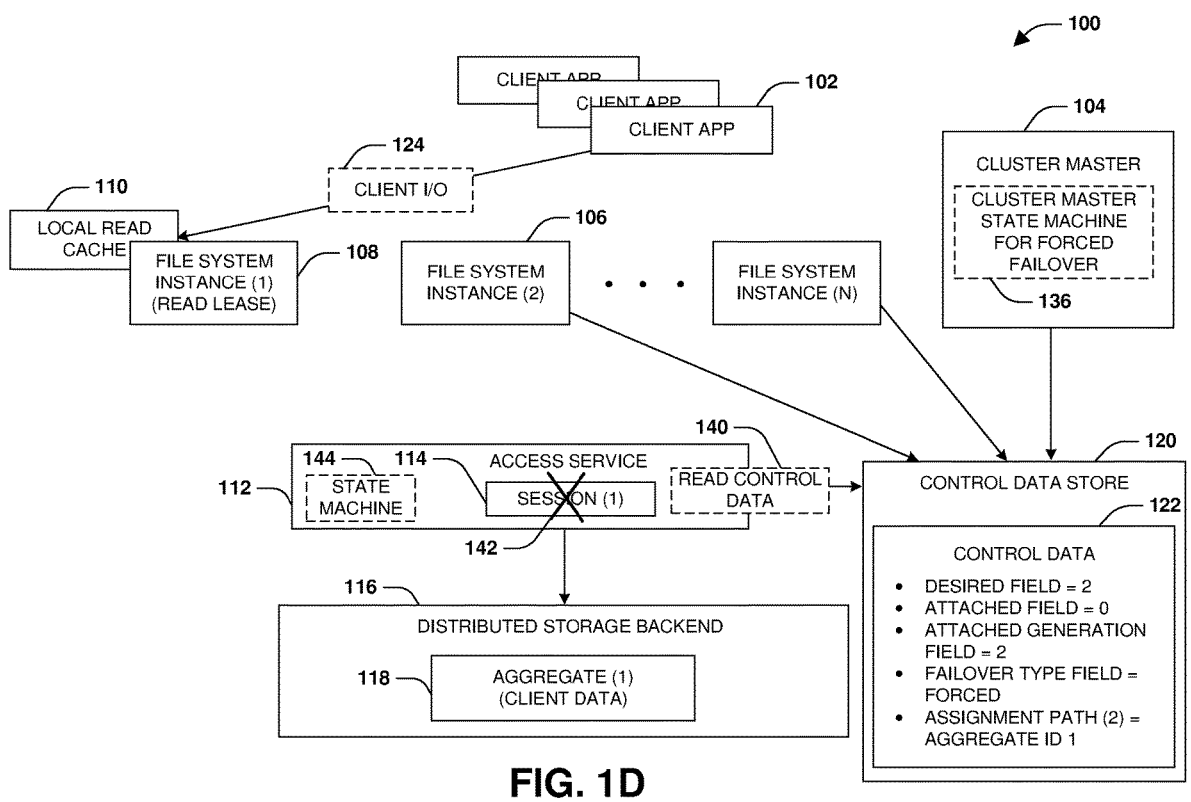

When the access service 112 reads 140 the control data 122 within the control data store 120, the access service 112 will determine that the attached generation field has been incremented to 2, as illustrated by FIG. 1D. Accordingly, the access service 112 may implement a state machine 144 to track the forced failover of the first aggregate 118. The state machine 144 may be transitioned to a first state. During the first state, the access service 112 may terminate 142 the first session 114 that the first file system instance 108 had with the access service 112 for accessing the first aggregate 118 through the access service 112. Once the first session 114 has terminated, the state machine 144 may be transitioned to a second state.

Figure 1E:
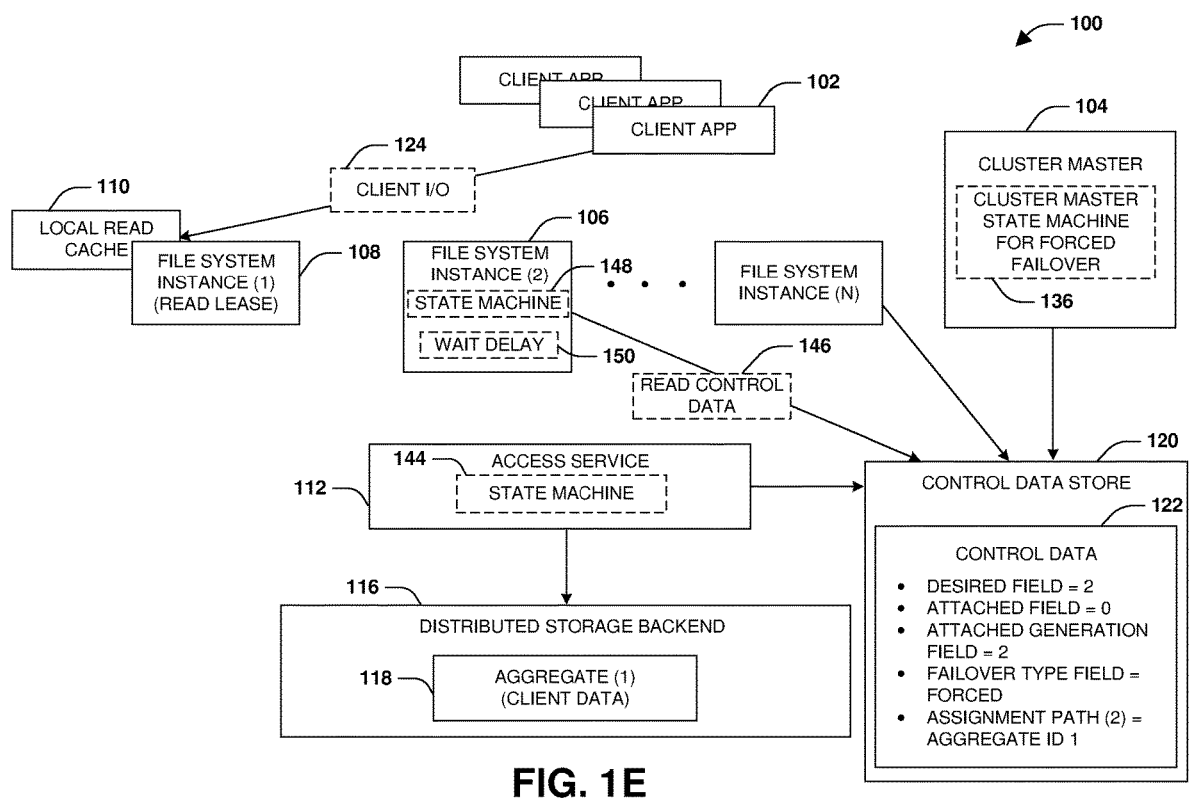

When the second file system instance 106 reads the control data 122, the second file system instance 106 will determine that the second assignment path for the second file system instance 106 has been populated with the first aggregate identifier of the first aggregate 118, as illustrated by FIG. 1E. Identifying the first aggregate identifier within the second assignment path triggers the second file system instance 106 to implement an internal state machine 148 for tracking progress of the forced failover. The second file system instance 106 may also read the desired field, the attached field, and/or the attached generation field from the control data store 120. During a first state of the internal state machine 148, the second file system instance 106 may wait 150 a delay (an expiration time period) before attempting to establish a session with the access service 112 and attach to the first aggregate 118. The wait 150 may be triggered based upon the second file system instance 106 determining that the failover type field within the control data 122 indicates that the failover is a forced failover. In this way, the second file system instance 106 waits the delay for the read release of the first file system instance 108 to expire.

During the time period where the read release is still valid, the first file system instance 108 may continue to process client I/O operations 124 directed to cached data within the local read cache 110. The first file system instance 108 will not be able to access the first aggregate 118 through the access service 112 because the access service 112 terminated the first session 114. Also, the access service 112 will not grant a new session to the first file system instance 108 because any session establishment request by the first file system instance 108 will not include a desired field value and/or an attached generation field value that match the current desired field value of 2 and the current attached generation field value of 2 known to the access service 112. Instead, the first file system instance 108 would provide a desired field value of 1 and an attached generation field of 1, which were the last values known to the first file system instance 108 before the communication error 130 where the first file system instance 108 could no longer access the control data store 120 for reading up-to-date control data 122. Once a threshold number of session establishment rejections are received by the first file system instance 108 from the access service 112, the first file system instance 108 may remove an in-memory infrastructure for the first aggregate 118.

In some embodiments, the access service 112 may implement a calculated owner function to identify a calculated owner of the first aggregate 118. The calculated owner function may be used to determine whether to grant or deny a request such as a request to access the first aggregate 118, a request to establish a session, and/or a request to obtain a read lease. The calculated owner function may specify that the calculated owner is a file system instance whose file system instance identifier is set within the attached field of the control data 122 (e.g., the second file system instance 106 with the file system instance identifier of 2 that is set within the attached field). If the attached field is not set to a file system instance identifier (e.g., cleared, set to 0, null, etc.), then the calculated owner function returns a file system instance identifier set within the desired field as the calculated owner.

Figure 1F:
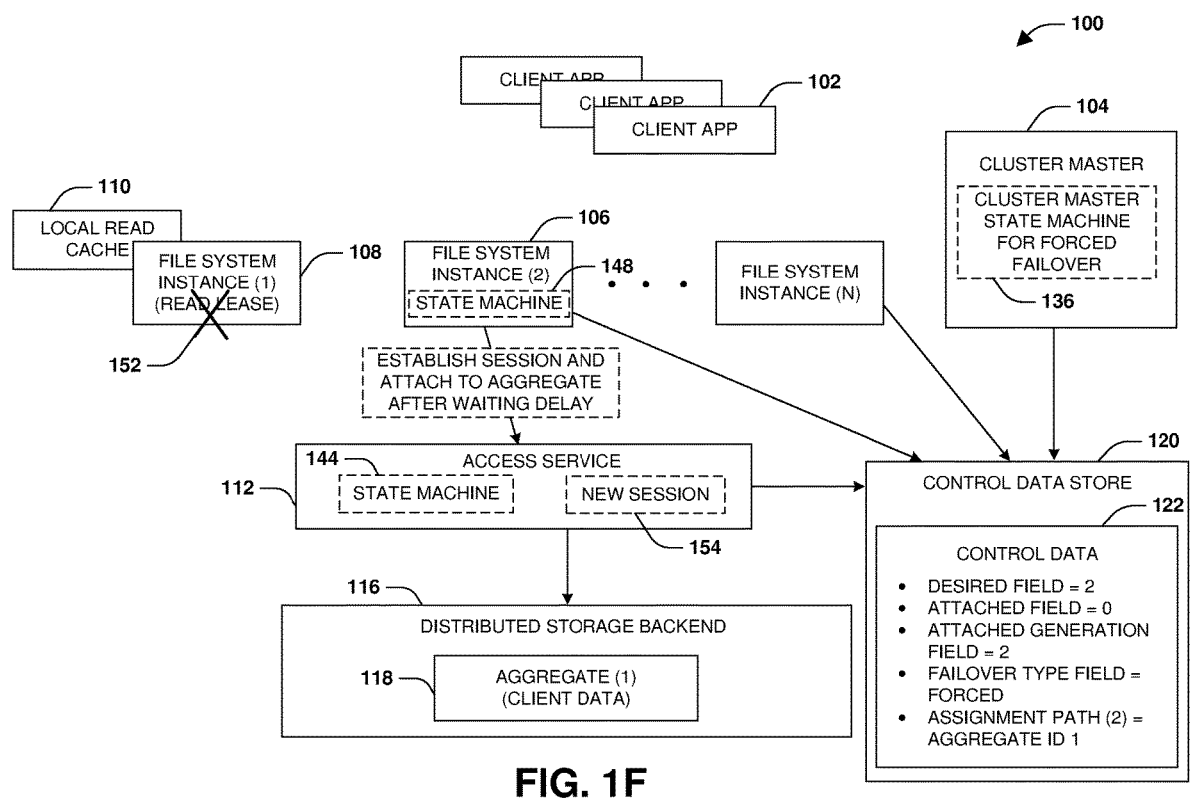

Once the second file system instance 106 has waited the delay where the read lease has expired 152, the internal state machine 148 may be transitioned to a second state. During the second state, the second file system instance 106 establishes a new session 154 with the access service 112 for accessing the first aggregate 118, as illustrated by FIG. 1F. The access service 112 will grant the new session 154 because the second file system instance 106 can provide a desired field value of 2 and an attached field value of 2 that will match a current desired field value and a current attached field value known to the access service 112 since both the access service 112 and the second file system instance 106 have access to the control data 122 populated with the current values. Once the new session 154 is established, the second file system instance 106 may transition the internal state machine 148 to a third state. During the third state, the second file system instance 106 attaches to the first aggregate 118 so that the second file system instance 106 can start processing client I/O operations directed to the first aggregate 118.

Figure 1G:
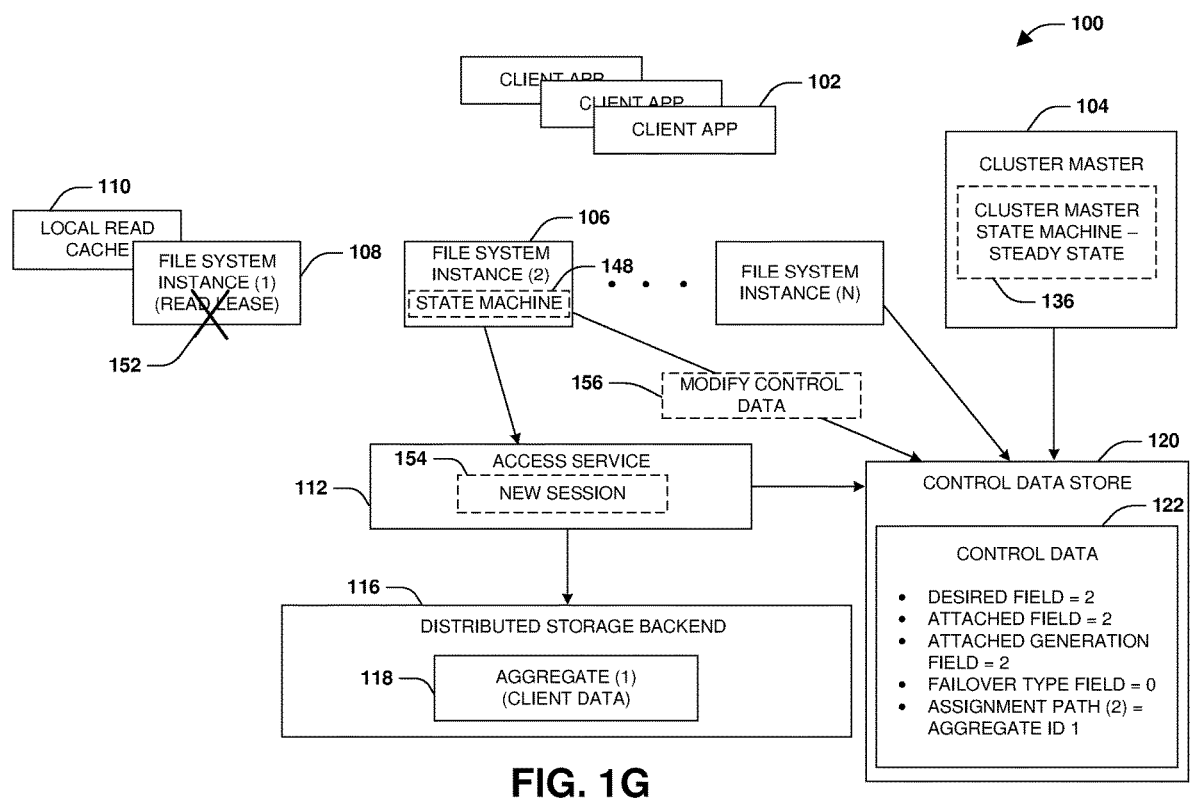

Once the second file system instance 106 attaches to the first aggregate 118, the internal state machine 148 may be transitioned to a fourth state. During the fourth state, the second file system instance 106 may modify 156 the control data 122, as illustrated by FIG. 1G. In particular, the second file system instance 106 sets the attached field to the second file system instance identifier of 2 for the second file system instance 106. Also, the failover type field may be cleared. In some embodiments, once the attached field is set, the state machine 148 may be transitioned to a fifth state (a steady state) where the second file system instance 106 can process client I/O operations directed to the first aggregate 118 or the state machine 148 may be removed from memory. Also, the cluster master 104 may transition the cluster master state machine 136 to a steady state or may remove the cluster master state machine 136 from memory.

Figure 1H:
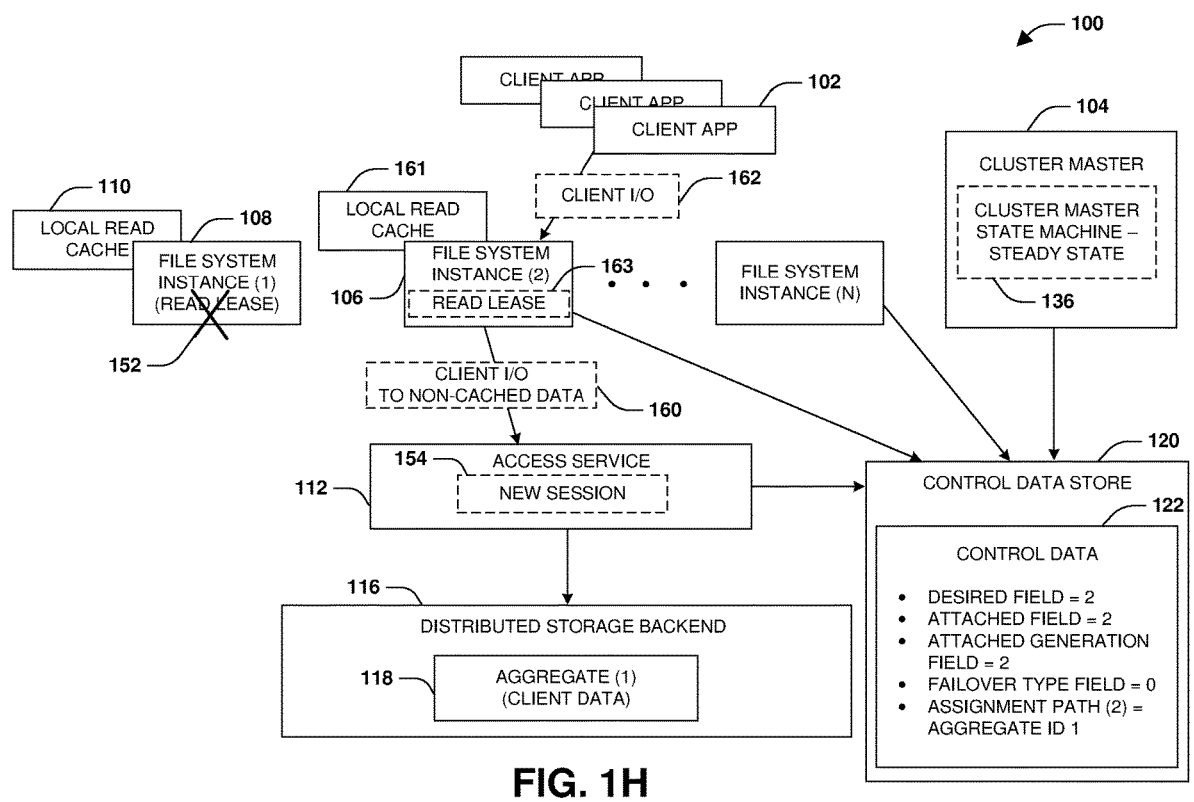

While in the steady state, the second file system instance 106 may obtain a read lease 163 from the access service 112 for processing client I/O operations 162 directed to cached data using a local read cache 161 of the second file system instance 106, as illustrated by FIG. 1H. Client I/O operations 160 not directed to cached data are routed by the second file system instance 106 to the access service 112 for execution upon the first aggregate 118 based upon the new session 154 being valid.

Figure 2A:
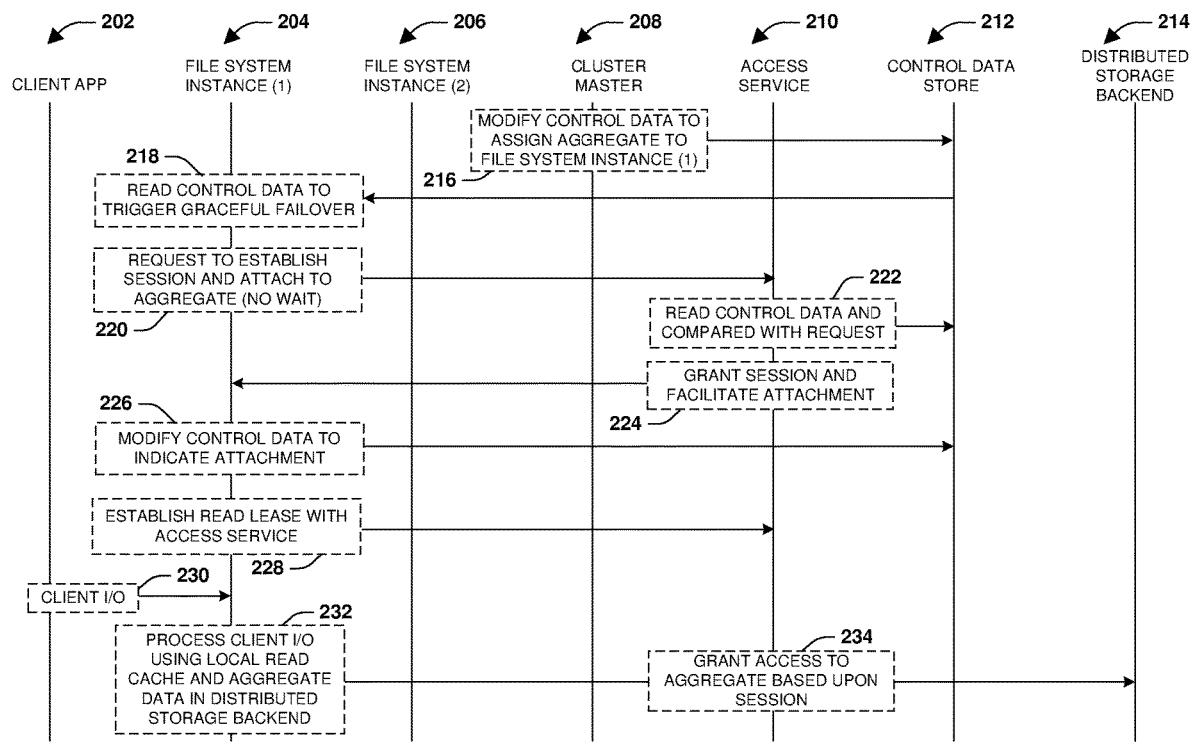
FIG. 2A is a sequence diagram illustrating an example of a set of operations for assigning initial ownership of an aggregate to a file system instance in accordance with various embodiments of the present technology.

FIG. 2A is a sequence diagram illustrating an example of a set of operations for assigning initial ownership of an aggregate to a file system instance in accordance with various embodiments of the present technology. A distributed scale-out storage system may include a distributed storage backend 214, a control data store 212 storing control data, an access service 210, a cluster master 208, a first file system instance 204, a second file system instance 206, and/or other file system instances that may process client I/O operations such as client I/O operations from a client application 202. The cluster master 208 may determine that an aggregate stored within the distributed storage backend 214 is to be initially assigned to the first file system instance 204. Accordingly, the cluster master 208 modifies 216 control data within the control data store 212 to indicate that the first file system instance 204 is to take ownership of the aggregate. The cluster master 208 may set a desired field to a file system instance identifier of the first file system instance 204, clear an attached field, and/or increment an attached generation field stored within the control data. The cluster master 208 may also set an assignment path for the first file system instance 204 to an aggregate identifier of the aggregate, and may set a failover type field to indicate that the aggregate is being assigned to the first file system instance 204 through a graceful failover (a non-forced failover).

The first file system instance 204 may read 218 the control data to determine that the aggregate identifier of the aggregate is specified within the assignment path and that the failover type field indicates that the graceful failover is being performed. Accordingly, the first file system instance 204 triggers the graceful failover. Because the failover type field indicates that the graceful failover is being performed, the first file system instance 204 can request 220 a session from the access service 210 and attach to the aggregate without waiting a delay corresponding to an expiration time period after which any read leases would expire. In response to receiving the request, the access service 210 reads 222 the control data from the control data store 212. In particular, the access service 210 reads 222 a current desired field value and a current attached field value within the control data of the control data store 212. Because the request may specify a desired field value and an attached field value that match the current desired field value and the current attached field value known to the access service 210, the access service 210 grants 224 the session and facilitates attachment to the aggregate by the first file system instance 204.

In response to attaching to the aggregate, the first file system instance 204 modifies 226 the control data in order to set the attached field to the file system instance identifier of the first file system instance 204. The first file system instance 204 may establish 228 a read lease with the access service 210 in order to serve client I/O 230 from a local read cache if the client I/O 230 targets cached data of the aggregate within the local read cache. Otherwise, if the client I/O 230 does not target cached data, then the first file system instance 204 executes the client I/O 230 upon the aggregate within the distributed storage backend 214 through 234 the access service 210 based upon the session. In this way, the first file system instance 204 processes 232 the client I/O 230 from the client application 202.

Figure 2B:
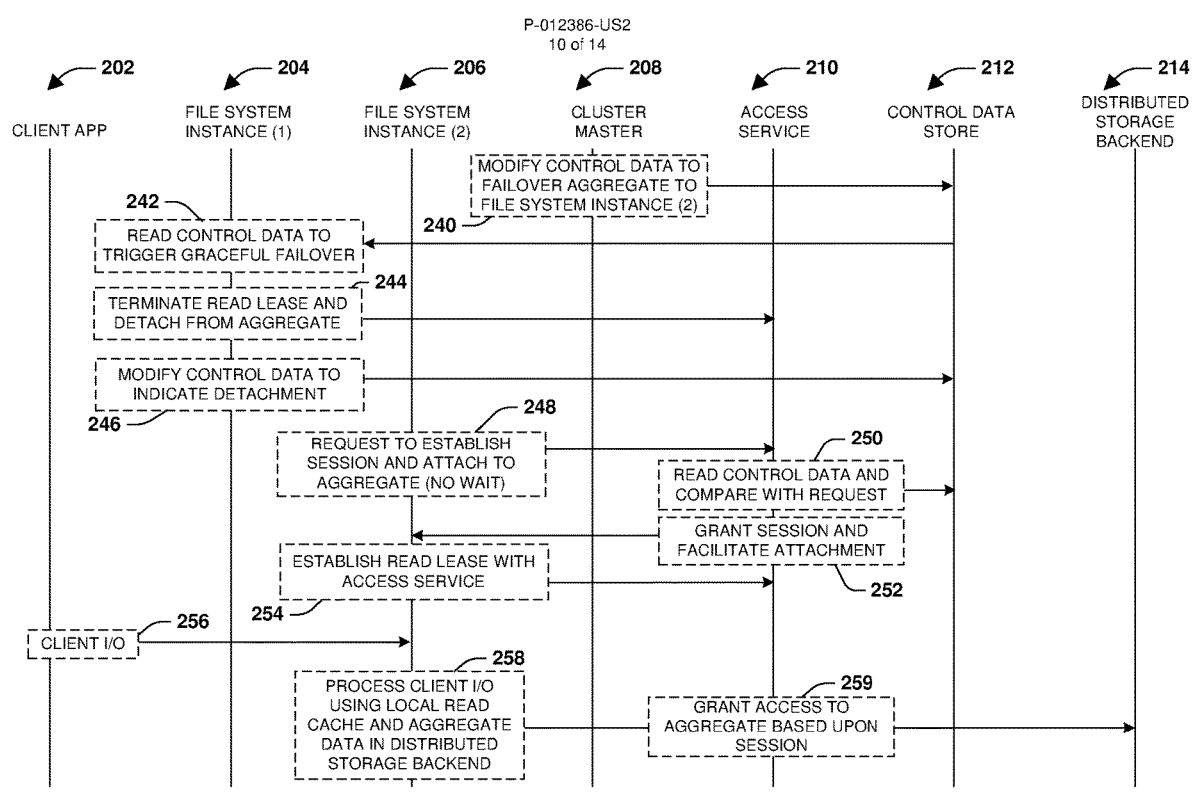
FIG. 2B is a sequence diagram illustrating an example of a set of operations for performing a non-forced failover of an aggregate in accordance with various embodiments of the present technology.

FIG. 2B is a sequence diagram illustrating an example of a set of operations for performing a non-forced failover of the aggregate in accordance with various embodiments of the present technology. The cluster master 208 may determine that the aggregate stored within the distributed storage backend 214 is to be gracefully failed over from the first file system instance 204 to the second file system instance 206. Accordingly, the cluster master 208 modifies 240 the control data within the control data store 212 to indicate that the second file system instance 206 is to take ownership of the aggregate and that the first file system instance 204 is to gracefully detach from the aggregate and terminate the read lease. The cluster master 208 may set the desired field to a file system instance identifier of the second file system instance 206 and increment the attached generation field stored within the control data. The cluster master 208 may also set an assignment path for the second file system instance 206 to the aggregate identifier of the aggregate, and may set the failover type field to indicate that the aggregate is being assigned to the second file system instance 206 through the graceful failover (a non-forced failover).

The first file system instance 204 may read 242 the control data to determine that the first file system instance 204 is to coordinate with the cluster master 208 (e.g., by updating the control data in order to perform and trigger coordinated actions) in order to implement the graceful failover. Accordingly, the first file system instance 204 terminates the read lease and detaches 244 from the aggregate through the access service 210. In this way, the access service 210 may terminate the session that the first file system instance 204 had for accessing the aggregate through the access service 210. In response to detaching from the aggregate, the first file system instance 204 may modify 246 the control data to indicate detachment, such as by clearing the attached field.

The second file system instance 206 may read the control data to determine that the second file system instance 206 is to take ownership of the aggregate based upon the aggregate identifier being populated within the assignment path of the second file system instance 206. The second file system instance 206 may determine that the ownership change is being performed through a graceful failover based upon the failover type field being set to indicate the graceful failover. The desired field indicates that the second file system instance 206 is the desired new owner, and the attached field indicates that no other file system instance is currently attached to the aggregate. Accordingly, the second file system instance 206 triggers the graceful failover.

Because the failover type field indicates that the graceful failover is being performed, the second file system instance 206 can request 248 a session from the access service 210 and attach to the aggregate without waiting a delay corresponding to an expiration time period after which read leases would expire. In response to receiving the request, the access service 210 reads 250 the control data, such as a current desired field value and a current attached field value within the control data of the control data store 212. Because the request may specify a desired field value and an attached field value that match the current desired field value and the current attached field value known to the access service 210, the access service 210 grants 252 the session and facilitates attachment to the aggregate by the second file system instance 206.

In response to attaching to the aggregate, the second file system instance 206 modifies the control data within the control data store 212 in order to set the attached field to the file system instance identifier of the second file system instance 206. The second file system instance 206 may establish 254 a read lease with the access service 210 in order to serve client I/O 256 from a local read cache if the client I/O 256 targets cached data of the aggregate within the local read cache. Otherwise, if the client I/O 256 does not target cached data, then the second file system instance 206 executes the client I/O 256 upon the aggregate within the distributed storage backend 214 through 259 the access service 210 based upon the session. In this way, the second file system instance 206 processes 258 the client I/O 256 from the client application 202.

Figure 2C:
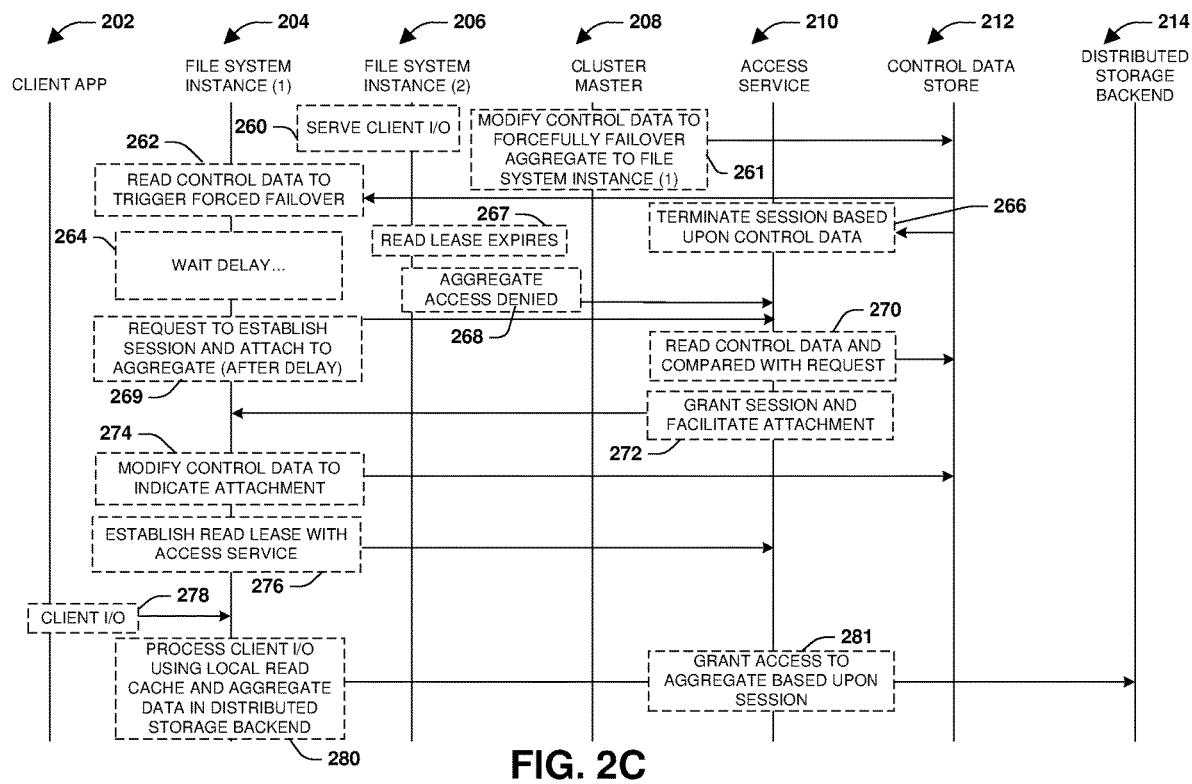
FIG. 2C is a sequence diagram illustrating an example of a set of operations for performing a forced failover of an aggregate in accordance with various embodiments of the present technology.

FIG. 2C is a sequence diagram illustrating an example of a set of operations for performing a forced failover of the aggregate in accordance with various embodiments of the present technology. The second file system instance 206 may be currently attached to the aggregate and serving 260 client I/O directed to the aggregate. While the second file system instance 206 has a valid read lease, the second file system instance 206 can utilize cached data within the local read cache for serving 260 the client I/O. The cluster master 208 may lose communication with the second file system instance 206 (e.g., a network partition occurs where the second file system instance 206 is still operational, but cannot communicate with the cluster master 208 and the control data store 212). Accordingly, the cluster master 208 triggers a forced failover to forcefully change ownership of the aggregate from the second file system instance 206 to the first file system instance 204. The cluster master 208 modifies 261 the control data within the control data store 212 to indicate that the first file system instance 204 is to attach to the aggregate and that the second file system instance 206 is to be forcefully detached from the aggregate. The cluster master 208 may set the desired field to the file system instance identifier of the first file system instance 204 and increment the attached generation field stored within the control data. The cluster master 208 may also set the assignment path for the first file system instance 204 to the aggregate identifier of the aggregate, and may set the failover type field to indicate that the forced failover is being performed.

The first file system instance 204 may read 262 the control data to determine that the aggregate identifier of the aggregate is specified within the assignment path and that the failover type field indicates that the forced failover is being performed. Accordingly, the first file system instance 204 triggers the forced failover. Because the failover type field indicates that the forced failover is being performed, the first file system instance 204 waits 264 a delay corresponding to an expiration time period for the read lease held by the second file system instance 206 to expire 267. Additionally, the access service 210 will terminate 266 the session held by the second file system instance 206 based upon the control data indicating that the attached generation field has been incremented, thus denying 268 access to the aggregate. Also, the access service 210 will deny session establishment requests from the second file system instance 206 because the session establishment requests will not include the most up-to-date desired field value and/or attached generation field value known to the access service 210. Before the read lease has expired 267, the second file system instance 206 can still process client I/O using the local read cache, which is not a problem because the first file system instance 204 is waiting 264 the expiration time period for the read lease to expire 267 before establishing a session and attaching to the aggregate.

Once the first file system instance 204 has waited 264 the expiration time period, the first file system instance 204 can request 269 a session from the access service 210 and attach to the aggregate. In response to receiving the request, the access service 210 reads 270 the control data, such as a current desired field value and a current attached field value within the control data of the control data store 212. Because the request may specify a desired field value and an attached field value that match the current desired field value and the current attached field value known to the access service 210, the access service 210 grants 272 the session and facilitates attachment to the aggregate by the first file system instance 204.

In response to attaching to the aggregate, the first file system instance 204 modifies 274 the control data in order to set the attached field to the file system instance identifier of the first file system instance 204. The first file system instance 204 may establish 276 a read lease with the access service 210 in order to serve client I/O 278 from a local read cache if the client I/O 278 targets cached data of the aggregate within the local read cache. Otherwise, if the client I/O 278 does not target cached data, then the first file system instance 204 executes the client I/O 278 upon the aggregate within the distributed storage backend 214 through 281 the access service 210 based upon the session. In this way, the first file system instance 204 processes 280 the client I/O 278 from the client application 202.

Figure 3:
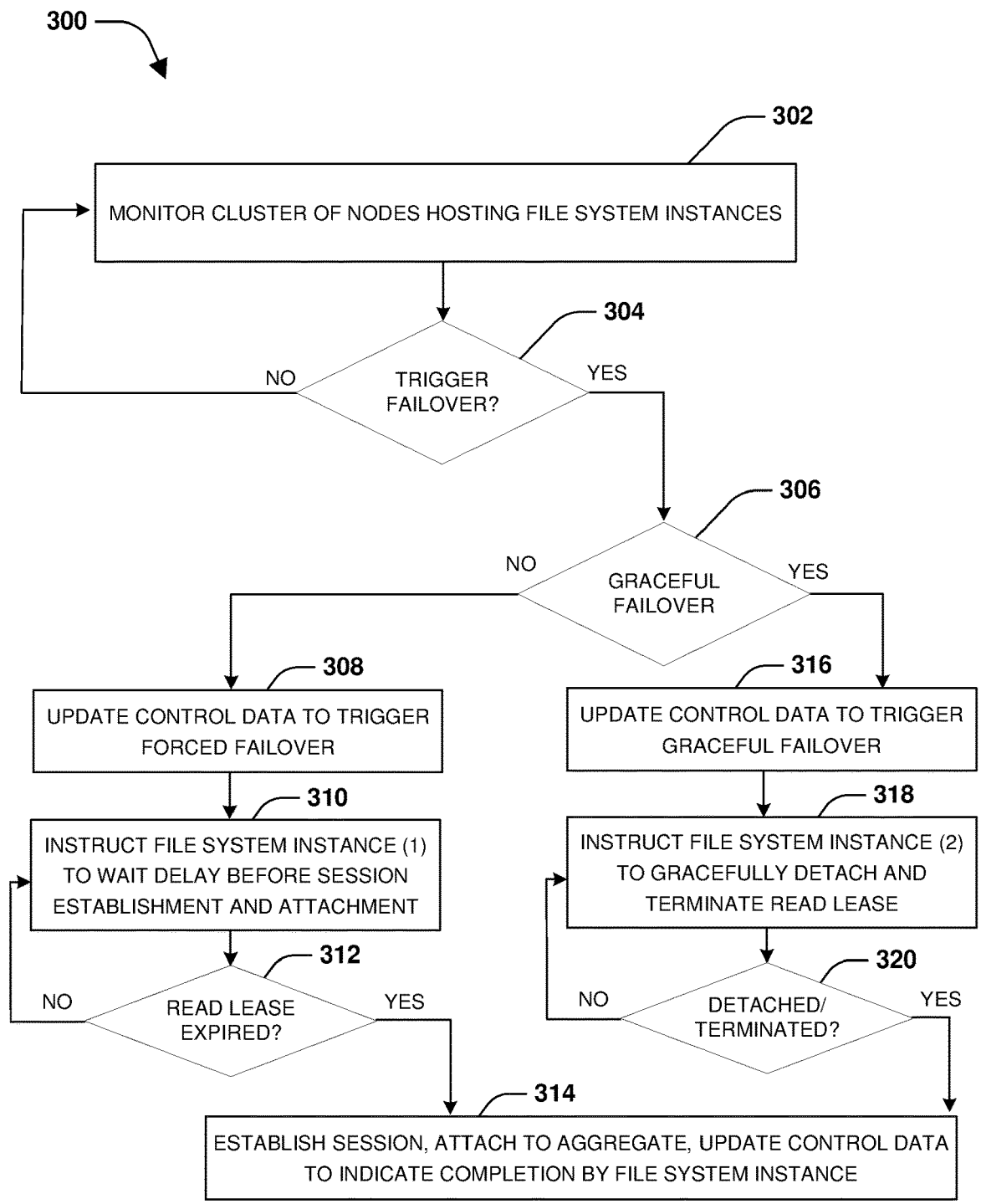
FIG. 3 is a flow chart illustrating an example of a set of operations of a method for performing an aggregate failover in accordance with various embodiments of the present technology.

FIG. 3 is a flow chart illustrating an example of a set of operations of a method 300 for performing an aggregate failover in accordance with various embodiments of the present technology. During operation 302 of method 300, a cluster master monitors nodes hosted file system instances of a distributed scale-out storage system. The cluster master may monitor operational status information of nodes in order to detect if particular file system instance has degraded health, has failed, or cannot communicate with the cluster master. This information may be used to determine whether a forced failover of an aggregate is to be performed because a file system instance has failed or the cluster master cannot communicate with the file system instance (e.g., the cluster master is no longer receiving heart beat information populated by the file system instance through a control data store because the file system instance can no longer access the control data store).

The cluster master may determine whether a failover of the aggregate is to be triggered, during operation 304 of method 300. The failover may be triggered for load balancing purposes, performance balancing purposes, in reaction to a failure or degraded health state of a file system instance, etc. The failover may transfer ownership of the aggregate from a second file system instance to a first file system instance. During operation 306 of method 300, a determination is made as to whether the failover is a graceful failover (a non-forced failover) where the second file system instance can still access the cluster master and/or the control data store or a forced failover where the cluster master cannot communicate with the second file system instance. In response to determining that the failover is the forced failover, the cluster master updates control data within the control data store in order to trigger the forced failover, during operation 308 of method 300. During operation 310 of method 300, the control data is used to instruct the first file system instance to wait a delay, corresponding to an expiration time period for a read lease held by the second file system instance to expire, before establishing a session and attaching to the aggregate. During operation 312 of method 300, the first file system instance determines whether the read lease has expired by determining whether the expiration time period has lapsed. If the expiration time period has not yet lapsed, then the first file system instance may continue to wait. If the expiration time period has lapsed and the read lease has expired, then the first file system instance establishes the session, attaches to the aggregate, and updates the control data to indicate completion of the forced failover, during operation 314 of method 300.

If the failover is a graceful failover, then the cluster master updates the control data to trigger the graceful failover, during operation 316 of method 300. During operation 318 of method 300, the control data is used to instruct the second file system instance to gracefully detach from the aggregate and terminate the read lease. During operation 320 of method 300, a determination is made as to whether the second file system instance has finished detaching and terminating the read lease, which may be determined by the first file system instance reading the control data that will be updated by the second file system instance with information indicating successful detachment. If the second file system instance has finished detaching and terminating the read lease, then the first file system instance establishes the session, attaches to the aggregate, and updates the control data to indicate completion of the forced failover, during operation 314 of method 300.

Figure 4:
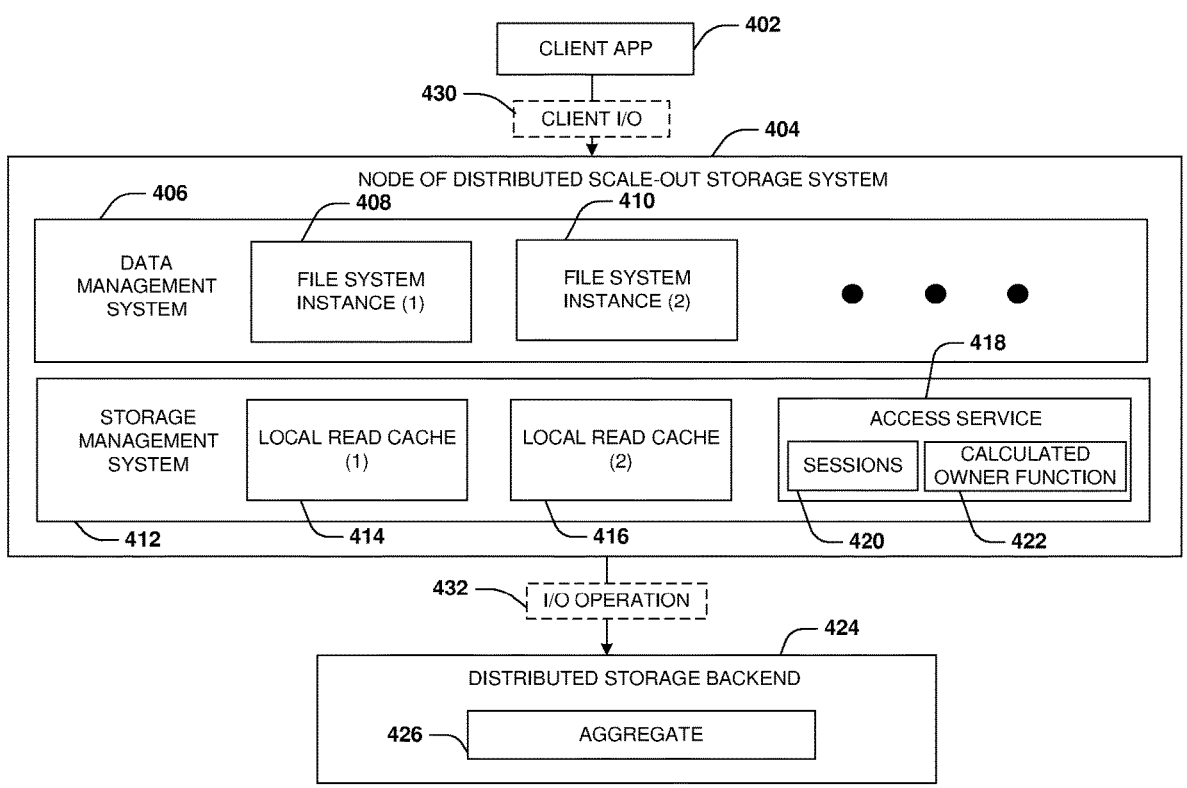
FIG. 4 is a block diagram illustrating an example of a node processing client I/O operations directed to an aggregate stored within a distributed storage backend in accordance with an embodiment of the present technology.

FIG. 4 is a block diagram illustrating an example of a node 404 processing client I/O operations directed to an aggregate 426 stored within a distributed storage backend 424 in accordance with an embodiment of the present technology. A distributed scale-out storage system may include a plurality of nodes configured to provide clients with access to storage of a distributed storage backend 424. The nodes may be hosted on computing hardware of the distributed scale-out storage system (e.g., processor and memory resources may be assigned to virtual machines or containers used to implement the nodes). The distributed storage backend may be accessible to the plurality of nodes. The distributed scale-out storage system may implement a cluster master configured to manage file system instances hosted by the nodes. The node 404 may implement a first file system instance 408, a second file system instance 410, and/or other file system instances using a data management system 406. The data management system 406 is a client facing frontend with which the client applications interact through a distributed control plane, such as the client application 402.

The data management system 406 may host one or more storage operating system instances, such as the first file system instance 408 and the second file system instance. In some embodiments, a file system instance may run on an operating system (e.g., Linux) as a process and may support various protocols, such as NFS, CIFS, and/or other file protocols through which clients may access files through the storage operating system instance. The file system instance may provide an API layer through which applications may set configurations (e.g., a snapshot policy, an export policy, etc.), settings (e.g., specifying a size or name for a volume), and transmit I/O operations 430 directed to aggregates and volumes (e.g., FlexVols) exported to the applications by the file system instance. In this way, the applications communicate through the control plane controller with the file system instance through this API layer. The data management system 406 may be specific to the node 404 (e.g., as opposed to a storage management system (SMS) 412 that may be a distributed component amongst nodes of the distributed scale-out storage system). The file system instance may comprise an operating system stack that includes a protocol layer (e.g., a layer implementing NFS, CIFS, etc.), a file system layer, a storage layer (e.g., a RAID layer), etc. The file system instance may provide various techniques for communicating with storage, such as through ZAPI commands, REST API operations, etc. The file system instance may be configured to communicate with the storage management system 412 through iSCSI, remote procedure calls (RPCs), etc. In some embodiments, the file system instance may communicate with virtual disks provided by the storage management system 412 to the data management system 406, such as through iSCSI and/or RPC.

The storage management system 412 is a distributed backend (e.g., instances of the storage management system 412 may be distributed amongst multiple nodes of the distributed scale-out storage system) used to store data on storage devices of the distributed storage backend 424. The storage management system 412 may be implemented by the node 404 as a storage backend. Local read caches, such as a first local read cache 414 for the first file system instance 408 and a second local read cache 416 for the second file system instance 410, may be maintained by the storage management system 412. The storage management system 412 may be implemented as a distributed component with instances that are hosted on each of the nodes of the distributed scale-out storage system.

The storage management system 412 may host a control plane layer. The control plane layer may host a full operating system with a frontend and a backend storage system. The control plane layer may form a control plane that includes control plane services, such as an access service 418 (e.g., a slice service that manages slice files used as indirection layers for accessing data on storage devices of the distributed storage backend 424), a block service that manages block storage of the data on the storage devices of the distributed storage backend 424, a transport service used to transport commands through a persistence abstraction layer to a storage manager, and/or other control plane services. In some embodiments where the access service 418 is implemented as a slice service, the slice service may be implemented as a metadata control plane and the block service may be implemented as a data control plane. Because the storage management system 412 may be implemented as a distributed component, the slice service and the block service may communicate with one another on the node and/or may communicate (e.g., through remote procedure calls) with other instances of the slice service and the block service hosted at other nodes within the distributed scale-out storage system. Thus, the node 404 (or a particular file system instance hosted by the node 404) may be a current owner of an object (an aggregate) whose data is sliced/distributed across storage device of multiple nodes, and the node 404 (the current owner file system instance) can use the storage management system 412 to access the data of the aggregate stored within the storage devices of the other nodes by communicating with the other instances of the storage management system.

In some embodiments of the slice service, the slice service may utilize slices, such as slice files, as indirection layers. The node 404 may provide the applications (e.g., client application 402), through a control plane controller, with access to an aggregate (e.g., a LUN, a volume, or other data container) using the data management system 406. In some embodiments, there the aggregate correspond to a LUN, the LUN may have N logical blocks that may be 1 kb each. If one of the logical blocks is in use and storing data, then the logical block has a block identifier of a block storing the actual data. A slice file for the LUN (the aggregate) has mappings that map logical block numbers of the LUN (the aggregate) to block identifiers of the blocks storing the actual data. Each aggregate (e.g., LUN or volume) will have a slice file, so there may be hundreds of slices files that may be distributed amongst the worker nodes of the distributed scale-out storage system. A slice file may be replicated so that there is a primary slice file and one or more secondary slice files that are maintained as copies of the primary slice file. When write operations and delete operations are executed, corresponding mappings that are affected by these operations are updated within the primary slice file. The updates to the primary slice file are replicated to the one or more secondary slice files. After, the write or deletion operations are responded back to a client as successful. Also, read operations may be served from the primary slice since the primary slice may be the authoritative source of logical block to block identifier mappings.

The access service 418 may provide file system instances with sessions 420 that allow the file system instances to attach to and access aggregates. In this way, a file system service attached to the aggregate 426 can execute I/O operations 432 through the access service 418 upon the aggregate 426 based upon the file system service having a session with the access service 418 for the aggregate 426. The access service 418 will allow a request directed to the aggregate 426 if the request originates from an owner of the aggregate 426, which is determined by a calculated owner function 422 implemented by the access service 418. The file system instances and the access service 418 may implement state machines used to track processing of performing aggregate failovers. The state machines may be internal state machines hosted within memory resources assigned to the node 404 by the distributed scale-our storage system.

Figure 5:
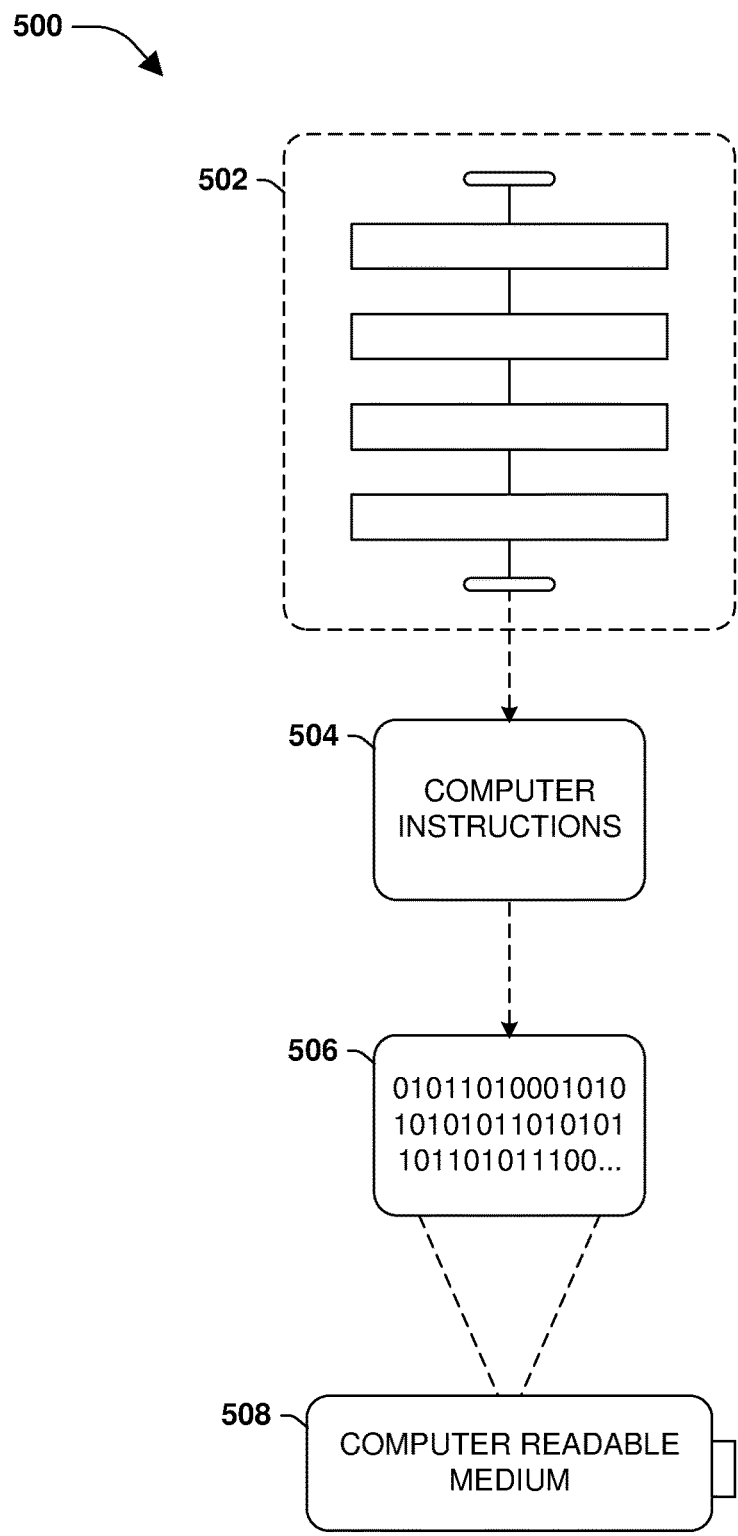
FIG. 5 is an example of a computer readable medium in which various embodiments of the present technology may be implemented.

FIG. 5 is an example of a computer readable medium 500 in which various embodiments of the present technology may be implemented. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. The computer-readable data 506, such as binary data comprising at least one of a zero or a one, in turn comprises processor-executable computer instructions 504 configured to operate according to one or more of the principles set forth herein. In some embodiments, the processor-executable computer instructions 504 are configured to perform at least some of the exemplary methods 502 disclosed herein, such as method 300, for example. In some embodiments, the processor-executable computer instructions 504 are configured to implement a system, such as at least some of the exemplary systems disclosed herein, such as the distributed scale-out storage system 100, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A distributed scale-out storage system, comprising:
    a control data store that stores a set of control data used by a state machine to track progress of a failover of an aggregate;
    a first file system instance attached to the aggregate for storing data within the aggregate, wherein the first file system instance obtains a read lease for serving client I/O, directed to the aggregate, from a cache;
    a cluster master that initiates the failover by modifying the set of control data to indicate that the first file system instance is to be detached from the aggregate and that a second file system instance is to attach to the aggregate; and
    the second file system instance that utilizes the state machine to track progress of the second file system instance:
        waiting an expiration time period for the read lease to expire;
        in response to waiting the expiration time period, establishing a session with an access service for attaching to the aggregate; and
        in response to successfully establishing the session and attaching to the aggregate, modifying the set of control data to indicate that the second file system instance is attached to the aggregate.

2. The distributed scale-out storage system of claim 1, comprising:
    a plurality of storage nodes hosting a plurality of file system instances provided with access to a distributed storage backend within which the aggregate is stored, wherein the plurality of storage nodes comprises a storage node including a data management system hosting a file system instance and a storage management system hosting the access service.

3. The distributed scale-out storage system of claim 1, wherein the cluster master:
    in response to determining that the second file system instance is to take over ownership of the aggregate as part of the failover, clears an attached field within the set of control data and populates a desired field within the set of control data with a file system instance identifier of the second file system instance.

4. The distributed scale-out storage system of claim 1, wherein the second file system instance:
    in response to attaching to the aggregate, populates an attached field within the set of control data with a file system instance identifier of the second file system instance.

5. The distributed scale-out storage system of claim 1, wherein the cluster master:
    increments an attached generation field within the set of control data based upon the cluster master modifying a desired field within the set of control data with a file system instance identifier of a file system instance that is to attach to the aggregate.

6. The distributed scale-out storage system of claim 1, wherein the access service:
    receives a request from a file system instance for session establishment, wherein the request specifies a desired field value and an attached generation field value;
    in response to determining that the desired field value and the attached generation field value match a current desired field value and a current attached generation field value tracked by the access service, initiates the session establishment; and in response to identifying a mismatch amongst the desired field value, the attached generation field value, the current desired field value, and the current attached generation field value, denies the session establishment.

7. The distributed scale-out storage system of claim 1, wherein the access service:
 implements a calculated owner function to identify a calculated owner for the aggregate, wherein the calculated owner function specifies that the calculated owner is a file system instance whose file system instance identifier is set within a current attached field value of the set of control data; and
 determines whether to grant the session based upon the second file system instance being the calculated owner and an attached generation field value provided by the second file system instance matching a current attached generation field value tracked by the access service.

8. The distributed scale-out storage system of claim 7, wherein the calculated owner function:
 in response to determining that the current attached field value is not set, determines the calculated owner based upon a current desired field value within the set of control data.

9. The distributed scale-out storage system of claim 1, wherein the state machine is at least one of implemented as an internal state machine hosted within memory assigned to the second file system instance or hosted within the control data store by a process, and wherein the state machine is used to track the set of control data for at least one of aggregate attachment, aggregate detachment, or initial aggregate placement.

10. The distributed scale-out storage system of claim 1, wherein the cluster master:
 in response to assigning a role for the aggregate to a file system instance, adds an aggregate identifier of the aggregate into an assignment path stored within the control data store for the file system instance, wherein the aggregate identifier within the assignment path triggers the file system instance to implement a state machine instance to perform an operation in order to take over the role for the aggregate.

11. The distributed scale-out storage system of claim 1, wherein the cluster master:
 in response to determining that the first file system instance is to be forcefully detached from the aggregate based upon the cluster master determining that the first file system instance is unable to process client I/O directed to the aggregate, sets a failover type field within the set of control data to indicate that detachment is being forced by the cluster master upon the first file system instance.

12. The distributed scale-out storage system of claim 11, wherein the second file system instance:
 in response to successfully attaching to the aggregate, clears the failover type field within the set of control data maintained within the control data store.

13. The distributed scale-out storage system of claim 1, wherein the access service:
 in response to receiving a request from the first file system instance with an attached generation field value that does not match a current attached generation field value within the set of control data, invalidates a current session of the first file system instance.

14. The distributed scale-out storage system of claim 1, wherein the first file system instance:
 processes client I/O requests targeting cached data of the aggregate using the cache until the read lease expires; and
 in response to receiving a threshold number of session establishment rejections from the access service based upon attached generation field value mismatches, removes an in-memory infrastructure for the aggregate.

15. A method, comprising:
 determining that a first file system instance is to be detached from an aggregate stored within distributed storage of a distributed scale-out storage system based upon an operational state of the first file system instance, wherein the first file system instance has a read lease for serving client I/O, directed to the aggregate, from a cache;
 modifying a set of control data within a control data store to indicate that the first file system instance is to be detached from the aggregate and that a second file system instance is to attach to the aggregate; and
 implementing a state machine to track progress of the second file system instance attaching to the aggregate, wherein the progress includes:
  waiting an expiration time period for the read lease to expire;
  in response to waiting the expiration time period, establishing a session with an access service for attaching to the aggregate; and
  in response to successfully establishing the session and attaching to the aggregate, modifying the set of control data to indicate that the second file system instance is attached to the aggregate.

16. The method of claim 15, comprising:
 setting, by a cluster master of the distributed scale-out storage system, a desired field within the set of control data with a file system instance identifier of a file system instance that is to attach to the aggregate.

17. The method of claim 15, comprising:
 incrementing, by a cluster master of the distributed scale-out storage system, an attached generation field within the set of control data based upon the cluster master modifying a desired field within the set of control data and clearing an attached field within the set of control data.

18. The method of claim 15, comprising:
 clearing, by a cluster master of the distributed scale-out storage system, an attached field within the set of control data to trigger forceful detachment of the first file system instance by the access service.

19. A non-transitory machine readable medium comprising instructions, which when executed by a machine, causes the machine to:
 provide a first file system instance with a read lease for serving client I/O, directed to an aggregate to which the first file system instance is attached, from a local read cache hosted by the first file system instance;
 in response to determining that the first file system instance is to detach from the aggregate and that a second file system instance is to attach to the aggregate, modify a desired field stored within a control data store for the aggregate with a file system instance identifier of the second file system instance;
 in response to the first file system instance determining that the desired field is set to the file system instance identifier of the second file system instance:
  terminate the read lease;

detach from the aggregate; and clear an attached field within the control data store for the aggregate; and in response to the second file system instance determining that the desired field is set to the file system instance identifier of the second file system instance and the attached field is cleared, attach the second file system instance to the aggregate.

20. The non-transitory machine readable medium of claim 19, wherein the instructions cause the machine to:

attach, by the second file system instance, to the aggregate without waiting for the read lease to expire based upon a failover type field within the control data store having a value indicating that the detachment of the first file system instance is being performed by the first file system instance.

* * * * *